United States Patent [19]

Anderson et al.

[11] 4,291,198

[45] Sep. 22, 1981

[54] GENERAL-PURPOSE ELECTRONIC TELEPHONE STATION SET

[75] Inventors: Robert V. Anderson, Westfield; Douglas L. Bayer, Somerset; David W. Hagelbarger, Morris Township, Morris County; Peter S. Kubik, South Plainfield, all of N.J.

[73] Assignee: Bell Telephone Laboratories, Incorporated, Murray Hill, N.J.

[21] Appl. No.: 53,099

[22] Filed: Jun. 28, 1979

[51] Int. Cl.³ .................. H04M 11/08; H04M 1/02
[52] U.S. Cl. ..................... 179/2 DP; 340/706; 364/900; 179/100 R; 179/18 B
[58] Field of Search .......... 340/711, 712, 706; 178/18; 179/2 DP, 90 AN, 2 TV, 90 B, 18 B; 364/200, 900

[56] References Cited

U.S. PATENT DOCUMENTS

| | | | |
|---|---|---|---|
| 3,521,008 | 7/1970 | Tyson | 179/100 |
| 3,566,370 | 2/1971 | Worthington, Jr. et al. | 364/900 |
| 3,587,053 | 6/1971 | Horzepa et al. | 364/900 |
| 3,643,219 | 2/1972 | Heimann | 340/706 |
| 3,757,037 | 9/1973 | Bialek | 178/18 |
| 3,792,462 | 2/1974 | Casey et al. | 340/706 |
| 3,932,709 | 1/1976 | Hoff et al. | 179/90 AN |
| 4,001,807 | 1/1977 | Dallimonti | 340/711 |
| 4,007,443 | 2/1977 | Bromberg et al. | 179/2 DP |
| 4,112,258 | 9/1978 | Alles | 179/15 |
| 4,117,542 | 9/1978 | Klawner et al. | 364/900 |
| 4,130,881 | 12/1978 | Haessler et al. | 364/900 |

OTHER PUBLICATIONS

Conference Record, 1977 International Conference on Communications, vol. 2, "An Advanced Home Terminal for Interactive Data Communication", pp. 19.6-4-7-19.6-50.
*The New York Times*, Dec. 4, 1978, "Macy's Superphone 7700", p. B9.
*Telephony*, Feb. 26, 1979, "Smart Phones, Aren't Coming, They're Here", pp. 45, 48, 50, and 52.
*Computer Design*, Jan. 1978, "TCC, Inc., Model 70 CRT Terminal", p. 31.

*Primary Examiner*—Gerald L. Brigance
*Attorney, Agent, or Firm*—Charles S. Phelan

[57] ABSTRACT

The power of computer-based services is made available to telephone subscribers by a telephone station set (10) including a telephone handset (17) for audio transduction, a video output display screen (13) and manual input key facilities (16,20,23) coupled for interaction by a data processing facility (43). All of those elements are included in a common station set housing for programmable interaction under control of the station set user. The input key facilities include a full ASCII key set, additional buttons (30-32) for signaling standard computer service functions, and keys (16) for user selection of predetermined different text portions of the display screen. Also shown are various electrical and mechanical features which facilitate the combining of the functional parts into the common housing and illustrative processes (FIGS. 8-12) for demonstrating the programmable facility interaction.

25 Claims, 15 Drawing Figures

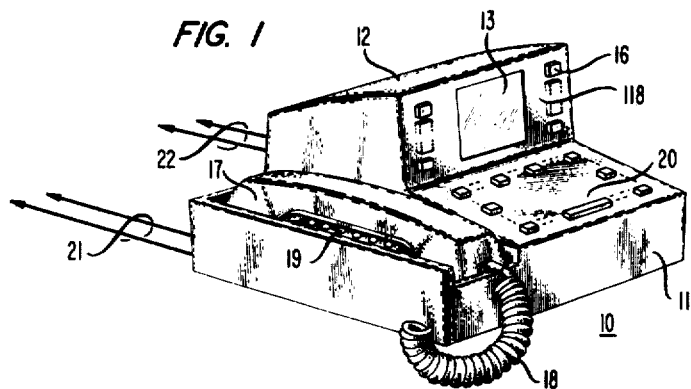
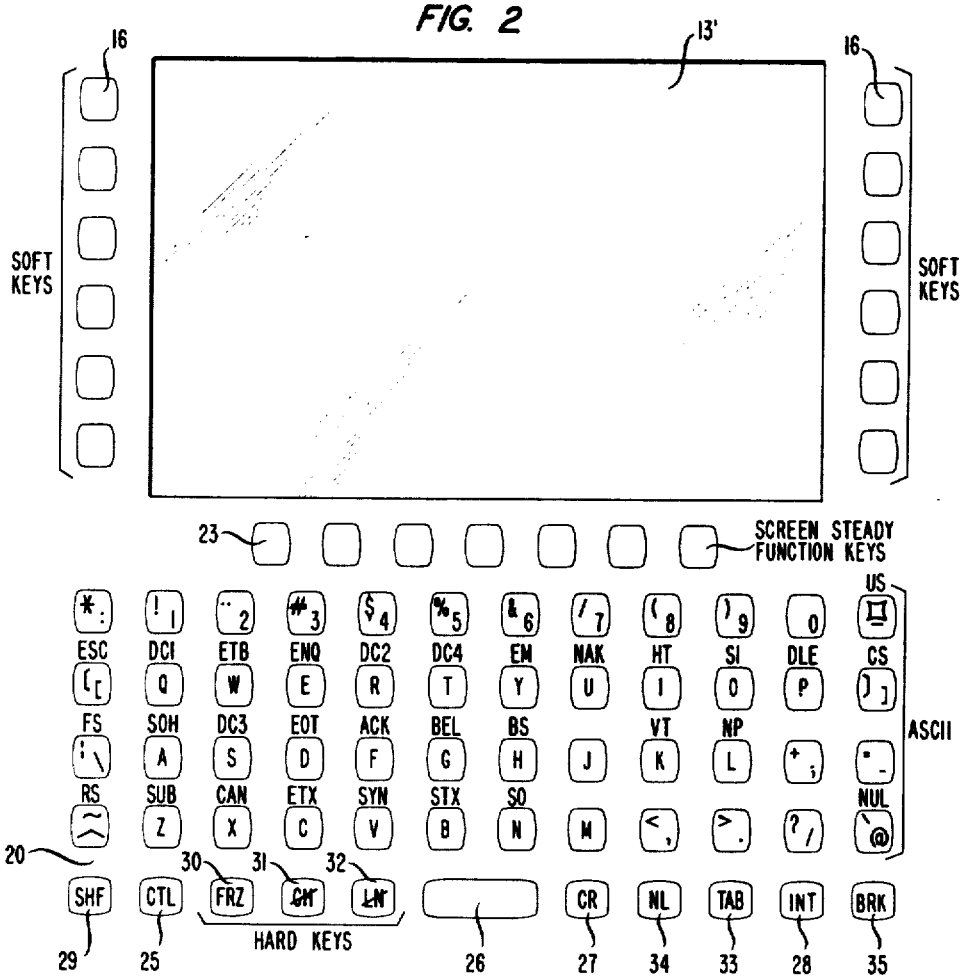

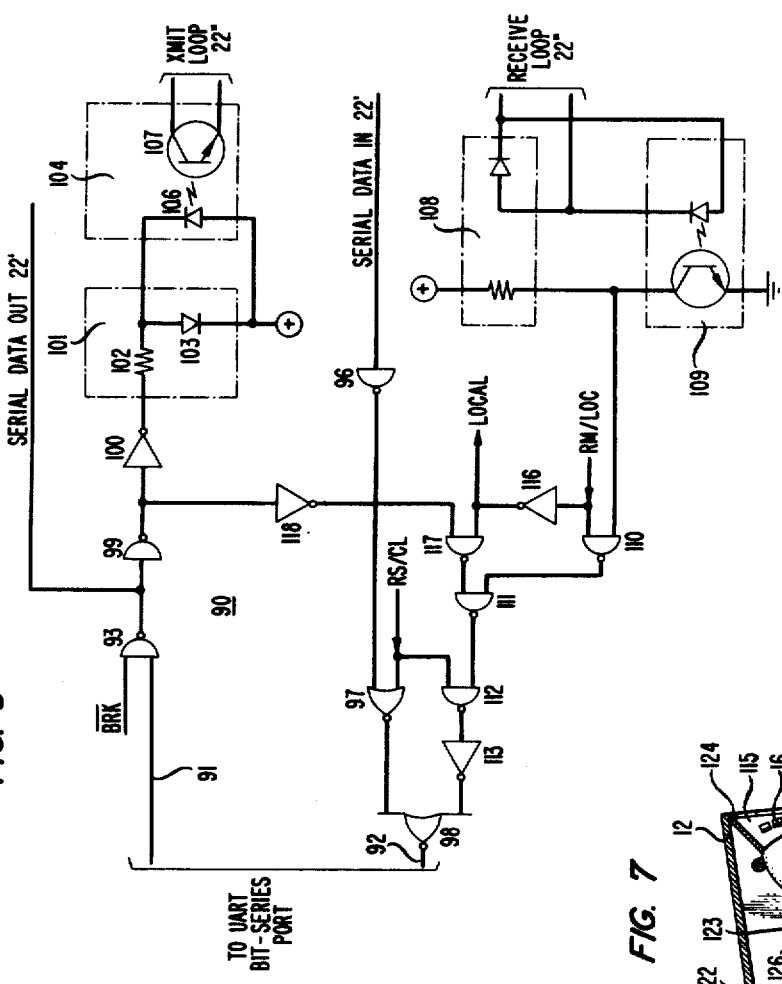
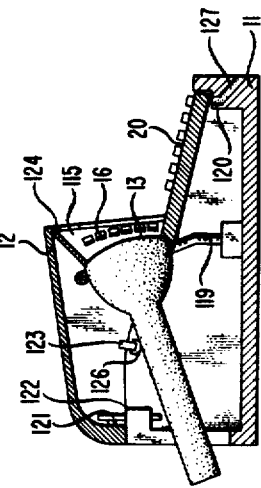
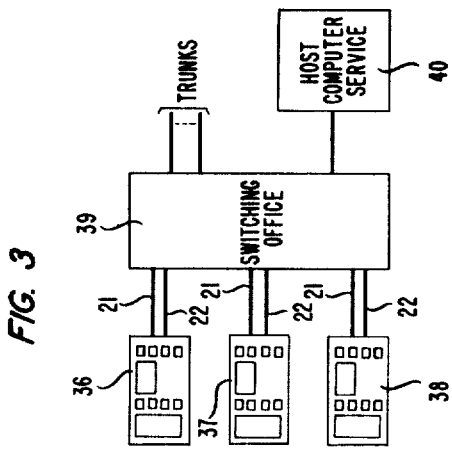
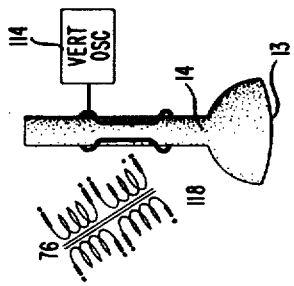

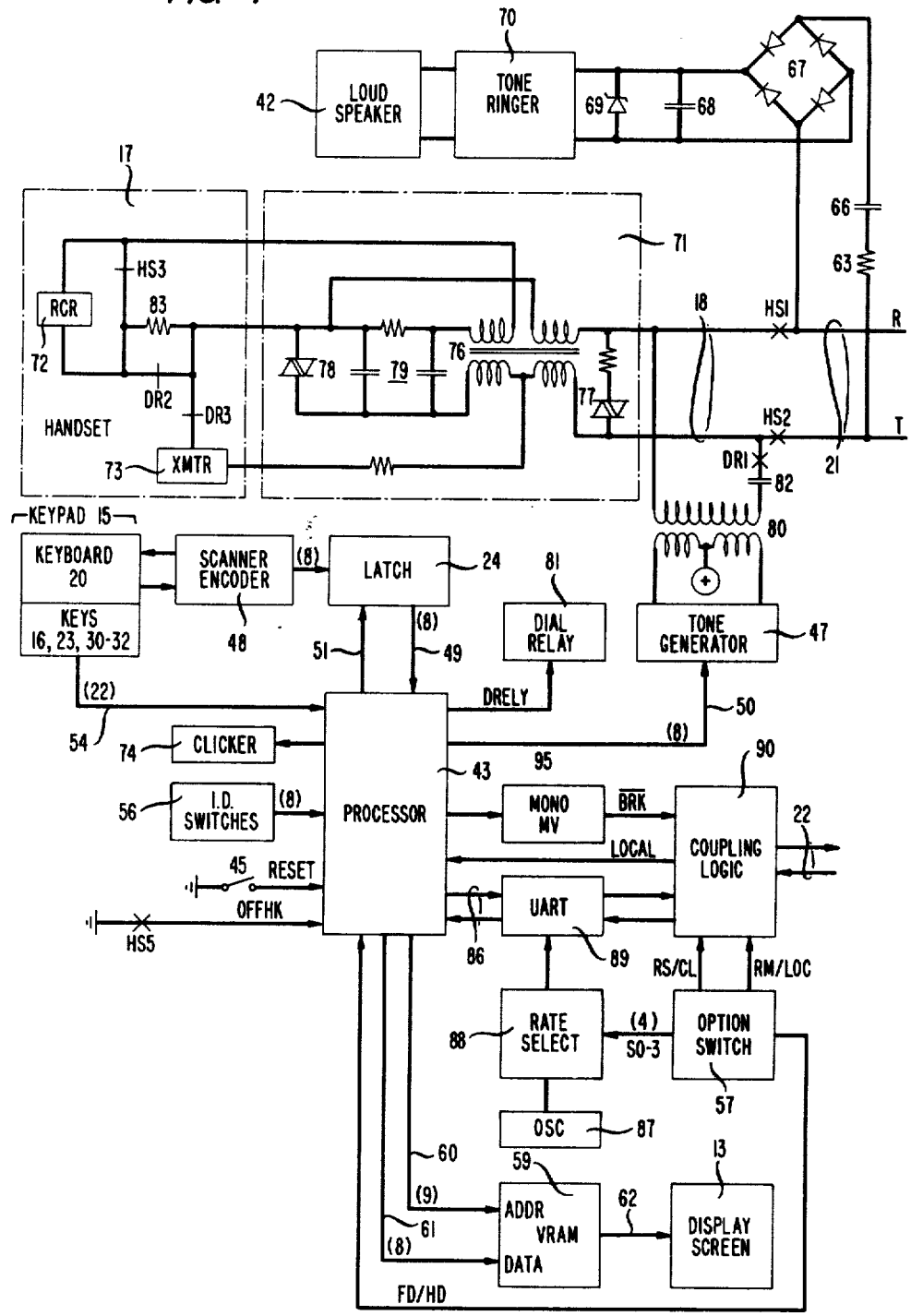

GENERAL-PURPOSE ELECTRONIC TELEPHONE STATION SET

RELATED APPLICATIONS

Ornamental design patent application in the names of D. W. Hagelbarger and P. S. Kubik, Ser. No. 52,985, filed on even date herewith, entitled "Design for a General-Purpose Electronic Telephone Set Base," and assigned to the same assignee as the present application.

BACKGROUND OF THE INVENTION

This invention relates to telephone station sets and it relates, in particular, to general-purpose sets incorporating multimedia input/output facilities for enhancing the utility of a telephone system for users thereof.

There are known in the art numerous computer-based services which have much to offer persons who are capable of accessing those services. However, the equipment usually available for providing such access is normally bulky, expensive, and requires considerable sophistication for use. Furthermore, because of the aforementioned equipment limitations, the available computer-based services often are not structured to provide many services that could be useful to either ordinary telephone users, or infrequent service users, or handicapped persons.

Telephone system terminals have been known to include audio, video, and manual transducing facilities in one piece of equipment. One example is the J. F. Tyson U.S. Pat. No. 3,521,008. However, such prior art does not teach equipment that is useful for convenient human interaction with computer-based services. It focuses instead on a normal telephone facility which is collocated with, but not cooperatively associated with, video equipment.

Video telephone service is also known as shown, for example, in the U.S. Pat. No. 3,587,053 to J. J. Horzepa et al. The latter type of service has limited capability (only a telephone dialing pad) for communication with data processing equipment and is otherwise useful for sending and receiving pictures. However, the video telephone equipment is bulky and complex, and the service is not suited for communication by way of narrow band voice and data signal channels such as the telephone network channels which span the world at the present time.

Microprocessor based computer terminals with manual input and video output are frequently advertised in the technical press by a number of manufacturers at the present time. However, these terminals are so large that they are unsuitable for locations of the type where one ordinarily finds only a telephone station set; and they also lack the audio telephone capability. One current example of such terminals is the TEC, Inc., Model 70 terminal CRT terminal with function keys.

A pocket directory-calculator in U.S. Pat. No. 4,117,542 to J. Klausner et al. includes a microprocessor controlled telephone-type keypad, a display, and an audio signal generating system that is stated to produce audible multifrequency dialing tones representing a retrieved telephone number. However, the equipment is not suited to accessing computer-based services in a telephone system.

Calculators with different types of limited telephone system access are known as represented in the U.S. Pat. No. 4,117,542 to Klausner et al. and Macy's Superphone 7700; but they also lack the full textual access to computer-based services.

It is further known, as taught in the H. S. McDonald U.S. Pat. No. 4,007,334, to provide switched computer-based services relating to arranging subscriber call connections in a digital switching system. Also the H. G. Alles U.S. Pat. No. 4,112,258 teaches digital switching of voice and data signals.

U.S. Pat. Nos. 3,566,370 to Worthington, Jr., et al. and 4,130,881 to Haessler et al. show display arrangements to facilitate the taking of medical histories by an automated multiple choice scheme. However, the equipment is large and does not enable the patient to make full textual inputs as are usually needed for use of computer based services generally.

None of the foregoing art provides a telephone user with a convenient, single instrument having audio and text transmission and reception facilities such as are necessary for utilizing a telephone communication network to provide subscriber access to computer-based services.

SUMMARY OF THE INVENTION

An illustrative embodiment of the present invention resolves the aforementioned difficulties of the prior art by providing a general-purpose electronic telephone station set which makes the power of computer-based services readily available to telephone system users. This general-purpose station set includes audio, video, and manual transducing facilities cooperatively arranged in a single instrument to enable users to have program guided access to computer-based services. It also includes data processing facilities for controlling interaction among the transducing facilities under the control of a station set user.

In one embodiment, video-display-line-associated keys permit a user to communicate to the processing facilities desired process branching selections. A full typewriting keyboard permits alphanumeric text entry as well as providing the telephone calling, i.e., dialing, function. Also, the set is so assembled as to render it a compact unit for convenient desktop or tabletop employment in, e.g., an office or other location not otherwise primarily dedicated to data processing system terminal use.

BRIEF DESCRIPTION OF THE DRAWING

A more complete understanding of the invention and the various features, objects, and advantages thereof may be obtained from a consideration of the following detailed description and the appended claims in conjunction with the attached drawings in which:

FIG. 1 is a perspective drawing of one embodiment of a station set utilizing the present invention;

FIG. 2 is a plan layout illustrating a display and various pushbutton-type keys in an arrangement which is useful in the invention as shown in FIG. 1;

FIG. 3 is a simplified block and line diagram of station sets of the type in FIG. 1 connected in a telephone communication system;

FIG. 4 comprises a simplified diagram of circuits includes in the station set of FIG. 1;

FIG. 5 is a gate level logic diagram of a coupling circuit in FIG. 4;

FIG. 6 illustrates electric circuit coil orientations for minimizing electromagnetic cross-coupling between two parts of the station set without necessitating special shielding;

FIG. 7 illustrates a mechanical interlocking arrangement for facilitating the assembling of the station set elements into a compact integral housing;

DETAILED DESCRIPTION

Figure 9:
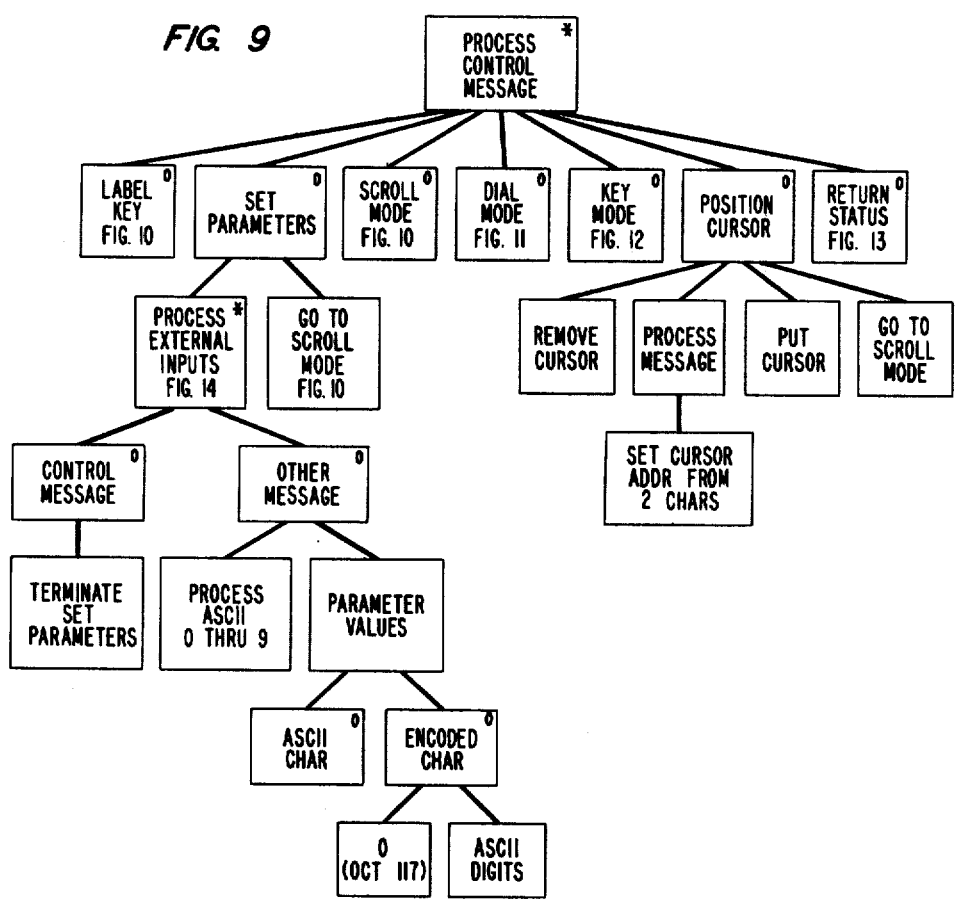
FIGS. 9-15 are process diagrams illustrating operation of the station set in several illustrative processes.

In FIG. 1, the illustrated general-purpose electronic telephone station set 10 comprises a housing including a base 11 and a hood 12. The base encloses most of the electric circuit components, to be described, and includes a data processor for coordinating the interactions among the other station set elements. The hood 12 is attached to the base, as will be subsequently described, and encloses display apparatus including a screen 13 of a cathode ray tube enclosed within the hood 12. Thus, the display accommodates page-type text displays for flexible user-computer interaction. The station set includes several different types of keys collectively designated as a keypad. One of these types includes a plurality of screen-line-associated pushbutton keys, such as the key 16, arrayed in two columns adjacent to the two sides of the screen 13. A handset-receiving receptacle is provided along one side of the station set adjacent to the hood 12 for receiving a handset 17 which is electrically connected through an electric circuit cord 18 to other circuits of the station set. A loudspeaker (not shown) is contained within the base portion 11 and acoustically coupled through holes 19 in the receptacle beneath the handset 17. The receptacle also contains an actuating member (not shown) beneath the handset 17 for operating a telephone system switchhook in a manner well known in the art.

A keyboard 20 is provided and is advantageously below and in front of the screen 13. The keyboard includes a plurality of keys for various purposes as will subsequently be described in connection with FIG. 2, and it is advantageously of a width corresponding to the width of the screen 13 and the two columns of keys 16. A principal purpose of keyboard 20 is the entry of alphanumeric text material for display on the screen and for use otherwise in controlling data processing within the set and within a host computer. The total width of the keyboard depends upon the degree of convenience desired for actuating the keys thereof and ranges from a relatively narrow keyboard suitable for two-finger, full-text typing in one embodiment to a wider keyboard which is more convenient for tough-typing. A separate subscriber loop circuit 21 and data signal circuit 22 are provided for the station set 10 to effect communication with external systems. It is to be understood, however, that in an appropriately controlled arrangement both voice and data can be combined onto a single circuit pair by either frequency or time multiplexing arrangements.

Handset 17 provides a convenient measure of the station set size. In one embodiment using a Western Electric Company K-type handset, the length of the handset 17 is slightly less than the front-to-back depth of the station set 10 (not including any rearward extension to accommodate a portion of the neck of the cathode ray tube providing the display screen 13). In a similar context, the set depth is slightly less than the width thereof assuming a cathode ray tube arrangement providing a substantially square display screen 13 as illustrated. A rectangular display screen permits a larger text display width and a wider keyboard for facilitating more rapid touch-typing in the manner previously suggested. Thus, the set depth and width are less than one and one-half times the handset length. The height of the station set 10 is less by about one-quarter than the length of the handset. In specific terms, the overall dimensions (including rear extension) of one embodiment using the mentioned K-type handset are about 9 inches wide, 10 inches deep, and 6 inches high.

The result of the described relative proportions in the station set 10 is that it is convenient to place the set on a desk or a table without obstructing the view of the rest of a room where a set is used and without dominating either the room or the table space. Furthermore, the relatively low profile of the station set yields a low center of gravity so that the set is not easily tipped over.

In using the station set in the embodiment of FIG. 1 for plain telephone communication purposes, dialing signals are entered by utilizing the keyboard 20 after the handset has been lifted. Upon completion of the calling information input for each digit, multifrequency dialing tone signals are automatically transmitted by the station set 10. Apart from such telephone use, the keyboard 20 is useful for inputting information for other purposes.

Furthermore, the station set interacts with a telephone switching office either in the telephone mode already described or by utilizing the switching office control processor as a host computer-based service. Likewise, other external host computer-based services are accessible through the switching facilities of the telephone switching office or by separate direct connection to the station set 10. Many station set functions considered herein depend for execution upon a host computer. However, it will be appreciated by those skilled in the art that technological advances in miniaturizations will permit a greater proportion of such functions to be performed by the set without the aid of a host.

FIG. 2 illustrates in a flat plan type of view a rectangular display screen 13' and keyboard 20 opened to form a flat diagram to facilitate illustration. The keys 16 in the two columns of keys along the sides of the display screen 13' are each associated with a different adjacent horizontal half-line-width region of the screen 13'. These keys permit a station set user to select a certain portion of the text in a display on the screen and correspondingly signal the selection to a station set processor, and to a host computer to which the station set is coupled at the time. Thus, actuation of the respective keys 16 do not represent fixed functions or cause corresponding characters to be displayed on the screen. Cooperative use of those keys 16 and screen 13' give the telephone set user convenient access to computer services as will be described.

A row of keys, such as the key 23, is arrayed along the bottom edge of the screen 13', and these are further designated as screen steady function keys. The result of actuation of a key 23 also does not appear as a particular displayed text character. These keys permit user selection of predetermined program control options which frequently recur in different steps of various station set processes. Some examples include display paging actions such as restart the program, explain the choices offered by the current display, back up to a prior process step, or display more information of the type already displayed. Thus, keys 23 are display-action-associated keys whereas keys 16 are display-lineassociated keys. Accordingly, it has been found to be advantageous in one embodiment to dedicate a key to each such action option type and leave the screen-line-associated keys 16 for other line-associated selections that are unique to a particular display. The keys 16 and 23 are sometimes called "soft keys" because they permit the telephone station set user to exercise specific control over the direction of execution of a computer-based process in which the set is engaged.

The keyboard 20 advantageously includes more than enough keys to produce a full set of character codes according to the recommended USA Standard Code for Information Interchange (ASCII), e.g., the 128 different codes representing numerals, letters, and various functions which can be signaled from the keyboard to the station set processor using upper and lower case key functions and certain predetermined combinations of key actuations as is well known in the art for ASCII keyboards. Textual characters corresponding to actuations of these keys are displayed on the screen, and control functions corresponding to actuations of the keys usually appear as actions in formation of the display, e.g. space, new line, or carriage return.

Included in the bottom row of the keyboard are some examples, such as the ASCII keys for "carriage return" 27, "new line" 34, and "interrupt" 28, as well as some additional fixed key functions such as a space key 26, shift key 29, a CTL control key 25, and break key 35.

That same bottom row of keys also includes three additional (non-ASCII) keys 30 through 32. These keys represent certain additional fixed functions often found in computer-based services but which use different character combinations in the different services. These keys 30 through 32 in the illustrative embodiment are sometimes called "hard" keys, to distinguish them from the aforementioned soft keys 16 and 23, and because their respective functions relate more to control of hardware than software. Typical functions of the type mentioned which are common to various computer-based services include delete last character CH, delete line LN, and stop terminal output FRZ. The keys 30 through 32 provide, when actuated, function call characters for those three functions, respectively; and the processor in station set 10 automatically translates the function call characters to the corresponding call code used for the particular computer-based service then interacting with the station set. The necessary data for this translation is obtained by the processor during initial handshake, i.e., set up operations, with the service when it is first connected.

FIG. 3 illustrates several general-purpose electronic telephone station sets 36, 37, and 38 of the type hereinbefore described in connection with FIGS. 1 and 2. All three of the station sets have two-wire voice lines 21 (subscriber loops) and data circuits 22 coupled to a telephone switching office 39 such as a class 5 telephone office switch or a private branch exchange switch. A digital switching office such as that described in the aforementioned Alles or McDonald patent is one example of such an office, and the disclosures of both such patents are hereby incorporated herein by reference in their entirety.

Within the office 39, the data circuits are advantageously switched into communication with a host, such as the host 40, as a peripheral unit. Sets such as the sets 36-38 are designed to be used with a host in the present state of the art and stand-alone use is usually employed only for testing, demonstrations, or emerging situations.

It is to be understood, however, that different proportions of the operational processing can be accomplished within the set and remotely as the state of the art at any time permits within the limit of having a small, conveniently usable set. Although the host 40 is shown at a separate location from the office 39 for convenience of illustration, it can also be located within the office or on the subscriber's premises where the office is a private branch exchange (PBX) in such premises. In the latter case the host functions and the PBX control functions are advantageously all performed by a single processor. In some applications where the sets 36-38 are relatively remote from the office 39 and coupled thereto by ordinary voice grade circuits, standard practice utilizes data modems (not separately shown) at the set and the office for digital signals.

FIG. 4 comprises a simplified diagram, partially in schematic form and partially in block and line form, of electric circuits of the station set of FIG. 1. The illustrated circuit elements are primarily commercially available elements, and where this is not the case additional schematic information is shown in this figure or in FIG. 5. In order to facilitate and understanding of the operation of the invention, the diagram of FIG. 4 shows primarily only data flow paths as realized in separate space divided or time divided channels between equipments. The provision of timing and control arrangements to implement such separate channels for operation of the illustrated equipment elements in accordance with an illustrative process diagram, to be described, is obvious to those skilled in the art.

The handset 17, the various types of keys of the keypad 15, the display 13, and a loudspeaker 42, all previously mentioned, are cooperatively coupled together by a data processing facility including a processor 43. That processor can be implemented in various ways depending upon how much processing is to be done in the set and how much in the host computer. In the illustrative embodiment processor 43 controls basic telephone functions (using the ASCII keyboard 20 for dialing). For screen display of text information and for other more elaborate functions, processor 43 cooperates with a host computer such as a Digital Equipment Corporation PDP 11/45 computer. In this environment processor 43 advantageously includes a microprocessor such as the INTEL Corporation 8748 microprocessor cooperatively coupled with a program memory, such as the INTEL 8755A programmable read only memory and the Intel RAM and I/O Expander 8155 which also provide supplemental input/output port facilities and supplemental buffer memory for the microprocessor in a manner now well known in the art. Such cooperative arrangements are taught, for example in the INTEL "MCS-48 TM Microcomputer User's Manual," 1978, pages 3-9, 5-7 to 5-9, and 6-33 to 6-49. This arrangement provides sufficient buffer storage for approximately one-half of a fully written screen, which has been found to be adequate for the general purpose station set application illustrated herein.

A data input port on processor 43 receives multibit station set identification number signals from ID switches 56 included in the station set and settable by the owner of the set to a predetermined number representation which is included in return status data messages, to be described, for providing data processing operation security and central office billing information.

One output from processor 43 is a CLKR signal supplied to a clicker 74. That clicker is, for example, a relay arranged so that when actuated its armature strikes a solid member, e.g., the station set chassis, to provide an appropriate clicking sound audible to the station set user upon actuation of any key on the keyboard 20, or associated with display 13, for informing the user that the processor has responded to the key actuation. Clicker 74 is selectively disabled by software instruction from a user or a host computer as will subsequently be discussed.

Keyboard 15 includes the various types of set 10 keys as hereinbefore outlined. Actuations of these keys are communicated to processor 43 in two different ways. The soft keys 16 and 23 and the hard keys 30–32 are connected to processor 43 by respective logic level signal leads in a twenty-two lead bus 54. Processor 43 recurrently samples the signal states of the leads in parts of the process utilizing the hard and soft keys. The sampling rate is sufficently high to assure detection of any changes. States of the keys of keyboard 20 are recurrently scanned at all times by a scanner encoder 48, such as the KR 2376 keyboard encoder chip of the Standard Microsystems Corp. That circuit provides clock signals to the keyboard for sequentially sampling the respective key states, and the samples are returned to the scanner encoder where an actuated-key sample causes a 7-bit snapshot of a clock pulse counter to be applied to a latch 24 to identify the actuated key. The snapshot is accompanied by an eighth but which gates all eight bits into the latch. Output of latch 24 is coupled to processor 43 by way of an eight-bit bus 49. The eighth bit is used as a flag in latch 24 to signal, when interrogated by processor 43, that there is information to be processed. A lead 51 from processor 43 carries signals which reset latch 24 after its contents have been read so that a new snapshot can be received. The total sequence of sampling, snapshotting, reading, and resetting occurs more than 50 times per second to be sure that no keyboard key actuations by even a fast human user are missed.

Another input to processor 43 provides an FD/HD (full duplex, half duplex) option signal from a set of option switches 57 also included in the station set and available to the station set user for selection during any particular call connection or other station set use. Still another lead to processor 43 is a handset hood status signal OFFHK as provided via contacts HS5 in FIG. 4 and which are part of the aforementioned switchhood associated with the handset 17.

A random access memory display controller VRAM 59, such as the Matrox Electronic Systems Limited of Canada video random access memory MTX1632A, is utilized with the microprocessor for exercising control of the driver circuits for the display screen 13 on cathode ray tube 14, FIG. 6. Such driver circuits are not separately shown but are advantageously those manufactured by the Electronic Display Division of Ball, Incorporated. Nine-bit addresses are provided to VRAM 59 from a data input/output port of processor 43 on a multibit bus 60. Data is provided to the VRAM 59 by way of a multibit data bus 61 extending from a processor input/output port. Read-out signals are also provided from VRAM 59 to the processor by way of the same bus 61 as needed, for example, in a display scrolling operation. An analog signal output port from VRAM 59 provides signals on a three-circuit bus 62 for coupling to the cathode ray tube separate signals for controlling horizontal deflection, vertical deflection, and beam intensity. The VRAM 59 thus receives from processor 43 signals defining the nature of a particular character to be displayed and the position on the display for that character, and it converts that information into the necessary deflection and beam control signals to write that particular information in the particulr region indicated on the screen 13.

During the course of a communication with the station set circuits as illustrated in FIG. 4, incoming ringing signals are received by way of the circuit 21 to alert the subscriber. The ringing signals are coupled from the circuit 21 through a limiting resistor 63 and a direct current blocking capacitor 66 to be full wave rectified in a bridge rectifier 67. Some of the high frequency ripple is bypassed by a shunt connected capacitor 68, and the remaining signal energy is limited in amplitude by a breakdown diode 69 prior to coupling to a tone ringing circuit 70 such as one using the S2561 ringer chip of American Microsystems, Inc. That chip, and associated resistors and capacitors connected to the chip in a manner well known in the art, accomplish the conversion of the ringing signals into the desired ringing tone, the latter tone is then utilized to actuate the loudspeaker 42 for alerting the subscriber.

Assuming an incoming voice signal call, the subscriber answers by lifting the handset 17 and thereby releasing a switchhook actuator (not shown) for allowing the various pairs of swtichhook contacts to close. Two sets of these contacts HS1 and HS2 close the line circuit 21 for direct current through to a hybrid network 71 which is, in turn, coupled to the handset 17. The hybrid network 71 is of a type currently in use in commercial telephone service for coupling the separate circuits of a receiver 72 and a transmitter 73 to the two-wire line circuit 21. The hybrid network includes a hybrid transformer 76 as well as varistor limiting devices 77 and 78 and a hybrid balancing impedance 79 in a common branch of the otherwise separate receiver and transmitter circuits.

In order to initiate an outgoing call, the station set user enters calling information using the keyboard 20 as previously noted. Processor 43 collects the sampled key information by way of the bus 49 and supplies that information to the host computer, in a manner to be described, to be associated with display-position-control address information and returned to processor 43. Thereafter the sample and position information are supplied to the VRAM 59 which develops the necessary outputs to control the cathode ray tube for writing corresponding characters in appropriate parts of the screen 13.

In addition, when the dialing information has been collected, and if the calling station set subscriber is off-hook as indicated to processor 43 by closure of contacts HS5, processor 43 supplies the dialing information to a tone generator 47 by way of a circuit 50. That generator is advantageously a Motorola MC14410 2-out-of-8 tone encoder. Generator 47 produces character-distinctive multifrequency tones corresponding to the respective dialing characters. Each tone is produced during a fixed interval and coupled through a transformer 80 and the switchhook contacts HS1 and HS2 to the line circuit 21.

When this dialing signal outputting function begins, the processor 43 also provides a DRELY signal which actuates a dial relay 81 to close contacts DR1 in series with a direct current blocking capacitor 82 at the tip conductor end of the secondary winding of transformer 80 to complete the tone output circuit. Additional dial relay contacts DR3 in the handset are opened in the circuit of the transmitter 73 for disabling that circuit during the transmission of dialing signals from generator 47. Also, contacts DR2 are opened to remove a short circuit from a resistor 83 in the circuit of the receiver 72 so that the dialing tone energy portion coupled back through hybrid network 71 is at an appropriately low level so that it does not disturb the user.

After each dialing tone has been transmitted for the necessary called party number, processor 43 disables dial relay 81 and thereby restores its associated contacts to their normal condition. After all dialing tones have been transmitted, the subscriber follows usual call progress tones until the completion, or other disposition, of his desired connection by the switch office. After completion of voice signal exchange with the called party, the subscriber hangs up by restoring handset 17 to its receptacle in the station set 10, the switchhook switch opens its contacts HS5 and thereby correspondingly signals processor 43 so that the processor program can respond accordingly. The called number display remains on the screen 13 until new data is supplied for the display area occupied by that number or the display is otherwise cleared by user command. For example, actuation of a RESET switch 45 in FIG. 4 by the user clears screen 13 and reinitiates the program of microprocessor 43.

For the purpose of data communication, processor 43 has a data input/output port coupled by way of a further multiconductor bidirectional bus 86 to the bit-parallel transmit and receive ports of a universal asynchronous receive transmit (UART) circuit 89 such as the Harris Corporation UART chip 6402-9. UART 89 also has bit-series input/output connections to the outside world by way of coupling logic 90 which is shown in greater detail in FIG. 5. That logic further couples UART signals by way of the circuit 22 to a host computer, either directly or via a data modem (not shown), as will be further described in regard to FIG. 5. An oscillator 87 has its output coupled to an input of a rate selection circuit 88 which is controlled by a four-bit output signal S$\phi$-3 from the option switches 57. The signal from circuit 88 is sixteen times the bit rate and is converted by logic in UART 89 to the required bit series and bit-parallel clock signals for use in the UART. Coupling logic 90 also receives from the switches 57 an RS/CL signal indicating which of two circuit interface standard signals is to be used and an RM/LOC signal indicating whether remote or local signals should control the screen 13 display. An additional FD/HD signal from switches 57 informs processor 43 whether the user has selected full duplex or half duplex operation.

FIG. 5 is a gate level schematic diagram of the connecting logic 90 in FIG. 4. Bit-series signals are coupled from the UART 89 on an input circuit 91 and to the UART on an output circuit 92. The output of coupling logic 90 corresponding to the circuit 22 is one or the other of the known RS232 (here RS) or current loop (here CL) interface standards for signal source impedance, voltage and current levels. Separate circuits 22' and 22" provide the selected standard coupling. Which of the two output circuits 22' or 22" will be used at any given time depends upon user selection of an RS/CL option signal from the option switches 57 and completion of a corresponding transmission circuit connection to 22' or 22" at the back of the station set.

Assuming first that the RS serial data coupling mode, e.g., to a modem, is selected by the RS/CL option signal, the lead 91 signals are applied to one input of a NAND gate 93 which also converts the signal from the TTL levels to the RS standard levels. A low BRK signal pulse from the keyboard, by way of processor 43 and a monostable trigger circuit 95, corresponds to actuation of a BREAK key 35. Otherwise when BRK is high, gate 93 inverts data signals from lead 91 to serial data output circuit 22'. The serial data input signal in circuit 22' is inverted by a single-input NAND gate 96, which also converts the RS standard signals to the TTL levels, before coupling to one input of NOR gate 97. That gate has the RS/CL option signal applied to its other input. Output of the gate 97 is coupled through a further NOR gate 98 to the return lead 92 to the UART 89.

For current loop coupling to a host computer-based service, the output of NAND gate 93 is inverted and restored to the TTL levels in a single-input NAND gate 99. The output of that gate is coupled through an inverter 100 to a signal limiting coupling element 101 including a current limiting resistor 102 and a shunt limiting diode 103 connected to the positive supply. Output from the element 101 is coupled through an optical coupling element 104 including a light-emitting diode 106 which cooperates with a photo transistor 107 to supply corresponding current loop signals to the transmit loop of circuit 22". Similarly, the receive loop of circuit 22" is applied in parallel across the light-emitting diode of receiving optical coupling element 109 and the limiting diode of a signal limiting element 108. Elements 108 and 109 have their respective resistor and transistor connected in series between a positive supply and ground. The midpoint between the resistor and transistor of those two elements is coupled through NAND gates 110, 111, and 112, and an inverter 113, to a second input of the NOR gate 98.

NAND gate 112 has applied to another input thereof the RS/CL option signal. When that option signal is low, NAND gate 112 is blocked; and its corresponding high output is coupled through inverter 113 as a low input to enable the gate 98. Thus, the series input data is inverted once in each of the gates 96 and the enabled 97 and 98 before reaching the lead 92. On the other hand, when the RS/CL signal is high, gate 97 is blocked; and gate 112 is enabled to couple data from NAND gate 111 through to the NOR gate 98.

The RM/LOC option signal is applied directly to one input of NAND gate 110 and coupled through an inverter 116 to a first input of NAND gate 117. The same input to gate 117 is also used as a LOCAL signal which is applied to the processor 43 to keep it informed of the circuit option selected by the user. Thus, one of gates 110 or 117 is always enabled and the other disabled. When it is desired to receive input from a remote source, the high RM/LOC signal enables gate 110 and forces gate 117 to be disabled thereby enabling NAND gate 111. The RS/CL signal must be high at this time also so gate 112 is enabled to couple received data signals from gate 111 on through NOR gate 98 toward the UART 89. A low RM/LOC signal is inverted to enable gate 117, and it blocks gate 110 thereby enabling gate 111. Input from the coupling element 109 is blocked, but local output signal from the output of NAND gate 99 is now coupled through an inverter 118 and the gates 117, 111, and 112 toward the UART. Thus, the user controls the times either when the data output of the station set will be recirculated, e.g., to the screen 13 of the same set or when that screen will be employed to display data received from a remote source through the element 109. The LOCAL option is useful for checking operation of the set.

Three user-selectable options described up to this point may seem to overlap, but they serve discrete functions. These are the RS/CL, FD/HD, and RM/LOC options. The RS/CL option is used to select the correct circuit configuration 22' or 22" to match the external facility to which the data portion of set 10 is to be connected. The FD/HD option is used to conform processor program to the operating mode of a host computer based service. The FD/HD state is set by switch change or command whichever occurred last. That is, in full duplex operation the station set keyboard output is transmitted to the host which echoes it back to control the set display, but in half duplex operation the set keyboard output is used (through the LOCAL mode) when available to control the set display and the host output is used (in the REMOTE mode) to control the set display as to information originated by the host. In either case of course, the display control is exercised through UART 89, processor 43, and VRAM 59. Finally, the RM/LOC option is available only when the CL option is in effect and is used to select a correct circuit configuration for either independently testing the station set or implementing display of set transmitted data in the half duplex mode of operation.

It can be seen from FIGS. 4-5 that the handset and associated voice circuits depend upon use of the keypad 15 and processor 43 to establish a voice communication path. The voice circuits thereafter operate independently through the voice signal port represented by connection to circuit 21; and the keypad and associated data circuits operate independently through the data signal port represented by connection to circuit 22. The combination of these discrete capabilities in the single station set gives new freedom to the set user. For example, the user while engaged in a voice communication with another person and using handset 17, can also engage in a data communication with a host computer using the keypad 15 and screen 13. The other station set must be one sharing the same host computer, or their respective hosts must have data communication capability. Thus, the host computer, or an aide using the second set, can keep the first set user informed of additional incoming voice calls on other lines, and that first user can respond with desired disposition of such additional calls. The set user engaged in a voice call simultaneously interrogates his host computer for such data as telephone numbers, appointments, or other previously stored information and update the data. In any case, the other party in the ongoing voice communication is unaware of the data communication.

Similarly, if handset 17 is not in use but the set user is engaged in a meeting with one or more visitors, silent data messages can be exchanged with the host computer; and a visitor that cannot view screen 13 will be unaware of the message content. The small size of the set and the recessed screen (as will be discussed) make this type of private video message operation possible. Likewise, if the set 10 is powered up while the user is out of the room, a message can be left on the screen by a remote caller if the host security arrangements permit. The host must however keep track of the state of the screen and store any surplus messages to prevent overwriting of a first message by subsequent messages.

FIG. 6 illustrates a particular orientation of the hybrid transformer 76 and the vertical deflection coils 118, i.e., the deflection coils operating in the audible frequency range, of the cathode ray tube 14 which includes screen 13. Circuit elements are necessarily close to one another in the illustrated station set. It was found that the cathode ray tube vertical oscillator coil and deflection yoke produced strong magnetic fields which injected noise into the circuits in which the hybrid coil 76 was connected. Rather than shield either of those coils, it was found that the hybrid coil 76 could be positioned to pick up a relatively low level of interference audible in receiver 72. This is achieved when the hybrid coil is located so that its mutual inductance with the combination of the vertical deflection yoke coil and the vertical oscillator coil is at or near zero. The most advantageous position was found in the illustrated embodiment to be an orientation in which the longitudinal axis of the straight core on which the coil 76 is wound, when the core is in a plane parallel to the bottom of the set, was at approximately a 30-degree angle to the projection of the neck of the cathode ray tube in the plane of the core. The longitudinal axis of the tube was at an angle of about 30 degrees to the plane of the bottom of the set. In that embodiment, the vertical oscillator 115 is located on the opposite side of tube 14 from coil 76 and with its coil in approximately the same plane as the neck of tube 14.

FIG. 7 is a cross-sectional view of the station set base 11 and hood 12 taken on a plane extending vertically through approximately the center of the display screen 13. All circuit elements except the cathode ray tube and the keyboard 20 have been omitted to facilitate illustration.

The cathode ray tube is held in place in the housing by a semirigid rod type support frame 119. Keyboard 20 rests on a rectangular shoulder 120 extending around the front wall of the base portion 11 and along a part of the two sidewalls thereof (only the front wall portion of the shoulder 120 is shown in FIG. 5). The keyboard 20 is made large enough to press against the screen 13 of the cathode ray tube for slightly deflecting the frame 119 rearward (to the left as illustrated) when the keyboard is in place in the illustrated rest position. This wedges the keyboard 20 into position between the front wall of base portion 11 and the lower edge portion of the screen 13, which portion is also simultaneously masked in a partial bezel fashion by the left-hand edge (upper edge in FIG. 1) of the keyboard.

An inverted-u-shaped bezel 115, advantageously formed of a flexible plastic such as polyvinylchloride, is further shaped to give the sides and bottom of the U an interior bevel effect so that the bezel cooperates with the sloping keyboard 20 to complete an inwardly sloping frame masking the edges of screen 13. The ends of the inverted-u bezel 115 rest on the top face of keyboard 20 while the interior edges of the bezel bear against screen 13. The hood 12 is assembled after the tube and bezel are in place by pressing opposite sides of the hood toward each other and lowering the hood over the bezel and the tube until a downwardly extending index finger 121 engages an aperture in a lip 122 at the back of the base portion 11. A lip 124 around the front opening of the hood holds bezel 115 against screen 13. Then the sides of the hood are relaxed to allow latching fingers, such as the finger 123, to engage a cooperating recess 126 in the sidewall of the base portion 11. The keyboard is then inserted by pressing the left edge, as shown in FIG. 7 against the lower tips of bezel 115 to press the bezel and tube 14 toward the left and thereby similarly deflect the frame 119 sufficiently to allow the right edge of the keyboard to be snapped into the base 11. This arrangement interlocks the keyboard 20, screen 13, bezel 115, and hood 12 in position so that they are relatively immovable.

In its rest position, the keyboard with its finite thickness is unable to pivot freely out of the base portion 11 because of the pressure applied by the deflected frame 119 through the cathode ray tube. However, the keyboard is advantageously separately removable by inserting a blade type member (not shown) through a housing aperture 127 to force the front edge of the keyboard upward and thereby additionally deflect the frame 119 by an amount which is sufficient to permit removal of the keyboard without first removing the hood 12 and bezel 115.

It is now evident that a user of the illustrative embodiment herein types messages to control processor 43 and a host computer but does not send such messages via the circuit 21 to the office 39 so there is no switched data path directly between a pair of sets. The only data path 22 interaction between sets is as different peripheral units sharing a common host computer that can act as a message relayer, with or without extra processing.

Figure 8:
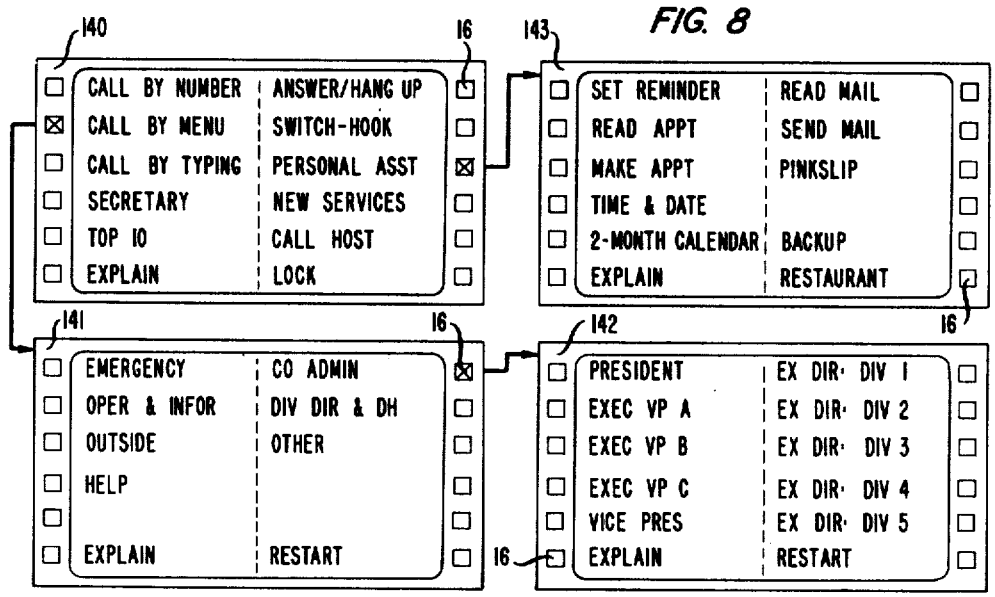
FIG. 8 shows illustrative station set display sequences in conjunction with screen-line buttons to demonstrate use of the station set.

Any utilization of the illustrated general-purpose telephone set is initiated by turning on a local power supply (not shown), operating the reset switch 45 in FIG. 4, and typing in a personal identification number to unlock set operation. This causes an initializing display, sometimes called a "menu," to be presented on the screen 13 for providing the user with an indication of the initial options that are available in that phase of operation. FIG. 8 illustrates in the upper left corner thereof one form of that initial display. Actuation of the key 16 adjacent to a label causes the host computer to have the screen erased and display a new menu, or set of selectable options, corresponding to the actuated key 16. Three of the additional displays that can be called, by actuating the one of the screen line keys 16 adjacent to an item displayed, are also shown for purposes of illustration. The keys to be activated are indicated by the keys marked with an "X" in the drawing and associated in the drawing by a line to the corresponding additional display.

In the initial display 140, different telephone calling operation types are shown. These include calling by number (enables dialing by typing a number on keyboard 20), by menu (calls a repertory-type function and name list used to cause the set to dial automatically a previously stored number for a selected name or function), or by typing (allows a user who already knows the key label for a desired function or name in a later display of a type-by-menu sequence to type in that label and cause the set to transmit the corresponding number or put up the corresponding display as may be appropriate). The user's secretary can also be called directly by selecting the corresponding one of keys 16, and similarly selection of "Top 10" results in display of the names of the user's top 10 aides. The "Explain" key causes a text display to be presented explaining how to deal with the options of the display that included "Explain". This display option and others such as "back-up" or "restart" in FIG. 8 are, of course, not necessary for station set embodiments having the keys 23 previously described. "Answer/Hand-up" causes the set to perform whichever of the two functions it had not done last. "Switch-hook" causes a switchhook flash to get central office operator attention. "Personal Asst" calls the personal assistance display 143, to be described. "New services" calls display of additional services not already on the initial display 140; and in particular, it makes available a list of other computer-based services to which the user may have access by connection through the central offices 39 and interaction using the various keys of the set 10. "Call Host" enables the user to interact with the particular host computer-based service, e.g. 41, of the set 10 as users of conventional character display terminals do in the present state of the art. "Lock" disables the entire station set 10 for further operation by way of transmission or access to processor 43 memories until the user types in his or her personal identification number (different from the set identification number in the switches 56).

The "Call by Menu" display 141 shows callable number group types that the user has previously stored. These include some typical categories for purposes of illustration. One of these is "Co. Admin." and its selection causes display 142 to appear showing company top management officials (illustrated by organizational functions but actual names can, of course, be used), and selection of any of these items of display 142 causes the set 10 to call that person's number directly. Alternatively, activation of a predetermined one of keys 23 for "traverse" followed by actuation of a key with display 142 causes a new display of names of the next lower level of administration in the selected organization. The "Restart" item allows the user to return the process to display 140.

Again in display 140, selection of "Personal Asst" causes display 143 to appear showing various types of services available in this category. "Set Reminder" calls a further display (not shown) to enable the user to program the set 10 to ring at a preselected time and display then the reason for the reminder. "Read Appt" calls a display of the next twelve appointments the user had previously stored in accordance with instructions displayed by selection of "Make Appt". The "Time & Date" and "2-Month Calendar" items display current time and date or the calendars for the current month and the next month. "Read Mail" displays messages that may have been recorded in the host computer memory by callers while the user was away from the set 10. "Send Mail" calls a process to enable the user to enter one or more addresses and a message to be sent out by the set 10 when it can gain acces to each addressee. The "Pink Slip" option calls a subroutine and appropriate corresponding displays to enable either the display of calling data for previously received calls that should be returned or the leaving of a call-back message for another subscriber having similar equipment. "Back up" causes the program to retrace the menu display sequence one display at a time. "Restaurant" displays a predetermined list of restaurants so the user can select one to be called by the set 10 without the user being required either to recall or to input the specific number each time that it is to be called.

Instructions to processor 43 will now be considered for carrying out elementary operations which are necessary for putting displays on the screen 13, user interaction with a host computer using the station set keypad, processing call connections for voice communication in calls initiated by user dialing a called party or by another party calling the set user, and set data interaction with the host. Basic commands to the microprocessor 43 are listed and described in Tables I and II which follow. Interactions produced by different combinations of these commands make it possible to perform higher order functions, such as those to be described in connection with FIGS. 9-15. Various combinations of the latter functions directed by the station set user or by the host computer service produce the externally evident set functions such as those previously herein outlined. Process implementation for other tasks which a user may want to perform will be apparent to those skilled in the art from the illustrations given.

Table I is a summary of illustrative command codes for the set 10. Currently these are prepended with an ASCII ESC (033₈) code, i.e., a prefix indicating that the code which follows has a meaning other than that in the usual ASCII set. An * by a comment in Tables I and II indicates an automatic return to scroll mode upon completion of the indicated operation. All operations except "x" restore the screen cursor to its initial position i.e., its position just prior to execution of an instruction presently being executed. As known in the art, the cursor has a visible part and a memory part. The latter part is an address stored in memory of processor 43 indicating where the next character will be written in the display. The visible part is advantageously the blinking of either a character that may already be in the selected location or of an underline segment placed in that location if there is no other character already there. The blinking character function is further utilized herein in connection with the screen line keys 16 as will be subsequently discussed.

It is observed in regard to Table I thap the character "t" has mutiple uses. When generated alone it has its usual text significance. When in a number string of op-code "u" it causes an outgoing call to be timed. When prefixed by the ESC character, "t" is itself an opcode.

Table II explains the use of the parameters "B" and "C" for the command "s" of Table I. A particular parameter "B" is specified by the host or by a set user by actuation of the indicated keyboard numerical key in a Table I "s" command. For that parameter the function named in the column "Meaning" is translated to the character indicated by parameter "C". "B" and "C" are both single ASCII characters. Default values in column "C" are the ones automatically utilized by the set processor in one embodiment after RESET key actuation and before any "s" codes are received. For example, any possible host is programmed so that, upon recognizing the identification code for a station set 10, it uses the "s" code to supply a new table of values for "C" which it uses for the functions identified in the "Meaning" column. In subsequent interactions with the host the processor 43 automatically performs the required translations (see FIG. 15) to accommodate the host.

TABLE I

| Op-Code | Parameters | Comments |
| --- | --- | --- |
| a-f | [string] | string is label for one of the 6 buttons on the left side of screen 13 ("a" for top one, "b" for the second, and so on). Labels are left justified. |
| g-l | [string] | string labels the buttons on the right side of the screen ("g" for the top, "h" for the second, and so on). Labels are right justified. |
| ESC | | Enter scroll mode. (Used, e.g., for displaying ordinary running text.) |
| s | [B] [C] | *The parameter specified by "B" is set to the value "C". (See TABLE II). |
| t | "1" — "9" | *Set tabs at intervals equal to specified number across screen. |
| u | [number string] | number string is number dialed using tone generator 47. The string may, by user option, include special characters such as NL (012₈) to cause status of the switchhook to be returned to host, and "l" (164₈) to cause the call to be timed. |
| w | | Enter key mode. |
| x | [r] [c] | *Position cursor for VRAM to row = r — 40₈ and column = c — 40₈. |
| y | | *Returns station set status, such as serial number and user-selected options, to host. |

TABLE II

| B | C (default value shown) | Meaning |
| --- | --- | --- |
| 0 | DC3 | The character which host recognizes as the start/stop output character is given by "C". |
| 1 | @ | Set the character associated with the Delete Line key to "C". |
| 2 | # | Set the character associated with the Delete Character key to "C". |
| 3 | \ | Define a STET character as "C". The STET character is prepended (by translation in processor 43) to keyboard characters also used by the host for a hard key function, e.g., so those characters can be freely used for ASCII purposes without the hard key functions. The host operating system deletes the STET character and the host uses the remaining character in its usual non-delete fashion. |
| 4 | NAK | The 3 least significant binary bits of "C" are specified by user inputs and set control bits as follows: Bit 0, 1 = full duplex, 0 = half duplex (overrides FD/HD option switch); Bit 1, 1 = raw mode, 0 = normal mode; Bit 2, 1 = clicker active, 0 = clicker off. The values for default character NAK (005₈) are: clicker active, normal mode, full duplex.) |
| 5 | DEL | The pad is set to "C". |
| 6 | DEL | The character emitted when the INT key is pressed is set to "C". (The "INT" character causes the host operating system to terminate output to the station set. A value of NULL (0) causes a BREAK signal to be sent to the host.) |

At line B=0 in Table II, a value of NULL (O), e.g., in a table provided by a new host, indicates that the host does not support this feature, and the set processor will then suppress transmission of the key activation to the host if the user calls for it.

The "pad character" mentioned in Table II at the line B=5 is a nondisplay filler sent by host when it needs a delay without disturbing its peripheral units. The station set learns during initializing handshake with host what the character is. When the pad character is received by the set processor, it is ignored. This allows the host to implement timing delays by emitting a number of pad characters.

FIGS. 9 through 15 represent the operation of processor 43 depicted in the form of program structure charts. These charts show what the processor does in recurrent cycles of operation, and they are readily understandable to programmers skilled in the art. Such charts are prepared in accordance with a technique called "hierarchical structure." This technique is explained in detail, for example, in Chapter 2 of *Principles of Program Design* by M. A. Jackson, Academic Press, New York, 1975. Each process charted flows from top to bottom as illustrated in the sense that for a block at any given level in a chart, the details of the operation performed by that block are depicted in one or more blocks in one or more lower levels of the chart connected thereto by lines in the chart.

Components of a chart include elementary component blocks which have no parts; and, after each execution of the portion of the process represented thereby, the process returns to the next point requiring further execution in a higher level from which the process under consideration was called. In addition, the program structure charts include three composite types of components. One of the composite types is indicated by a small zero in the upper right hand corner of each block of this type and it indicates a selection is to be made among blocks of the same type at the same level in the diagram. On completion of the selected block execution, the process returns to the next higher level requiring further processing. A second composite type is indicated by an asterisk in the upper right hand corner of the block and is an iteration. A function represented by such a block occurs zero or more times; and if the blocks of the next lower level are of an unmarked type, the functions of those lower level blocks are executed in recurring sequence from left to right as illustrated until a termination function is attained in some lower level block. Then the process returns with the termination exit information to the higher level at which the iteration was called and proceeds in accordance with the exit information. The third composite type of component is indicated by a block having only the name of the function to be performed and no special marking in the upper right hand corner thereof. This third type is called a sequence and indicates that blocks of the same level and appended to the same higher level block are to be executed in a sequence extending from left to right as illustrated one time, and then the process returns to the next higher level requiring further execution.

Several additional schematic conventions are to be noted. The term "PUT" in a block label means to put a character under consideration on the display screen 13. The term "SEND" means to send the character under consideration to the host computer through the UART 89. Any character string beginning with STX (meaning start of text) and ending with CR (meaning carriage return) is a status message and indicates that the process must collect certain information, determined by the location in the process at which the message is used, and transmit it in the character string to the host computer. SCROLL moves all lines of text on the screen 13 up one line and clears the bottom line. SCROLL can occur only when in the SCROLL mode and with the cursor on the last line of the display. Figure references contained within a block indicate the figure where process details are shown. The term RESET indicates an operation which clears the text displayed on screen 13 and causes the process to go to the SCROLL mode.

Processor 43 recurrently operates in accordance with the chart of FIG. 9. Thus, in PROCESS CONTROL MESSAGE (PCM) the processor obtains a control message from its internal data buffer (not separately shown) and executes one of the seven selection type functions illustrated in the second level from the top in FIG. 9. These selection functions correspond to the Table I processes. The process then returns to the data buffer to obtain a new control message. Each of the selection processes in the second level of FIG. 9 is indicated in more detail either in FIG. 9 or in one of the FIGS. 10 through 13. In the latter figures, the same selection block of FIG. 9 is repeated at the top of the chart in the further figure to provide convenient cross-reference.

Figure 10:
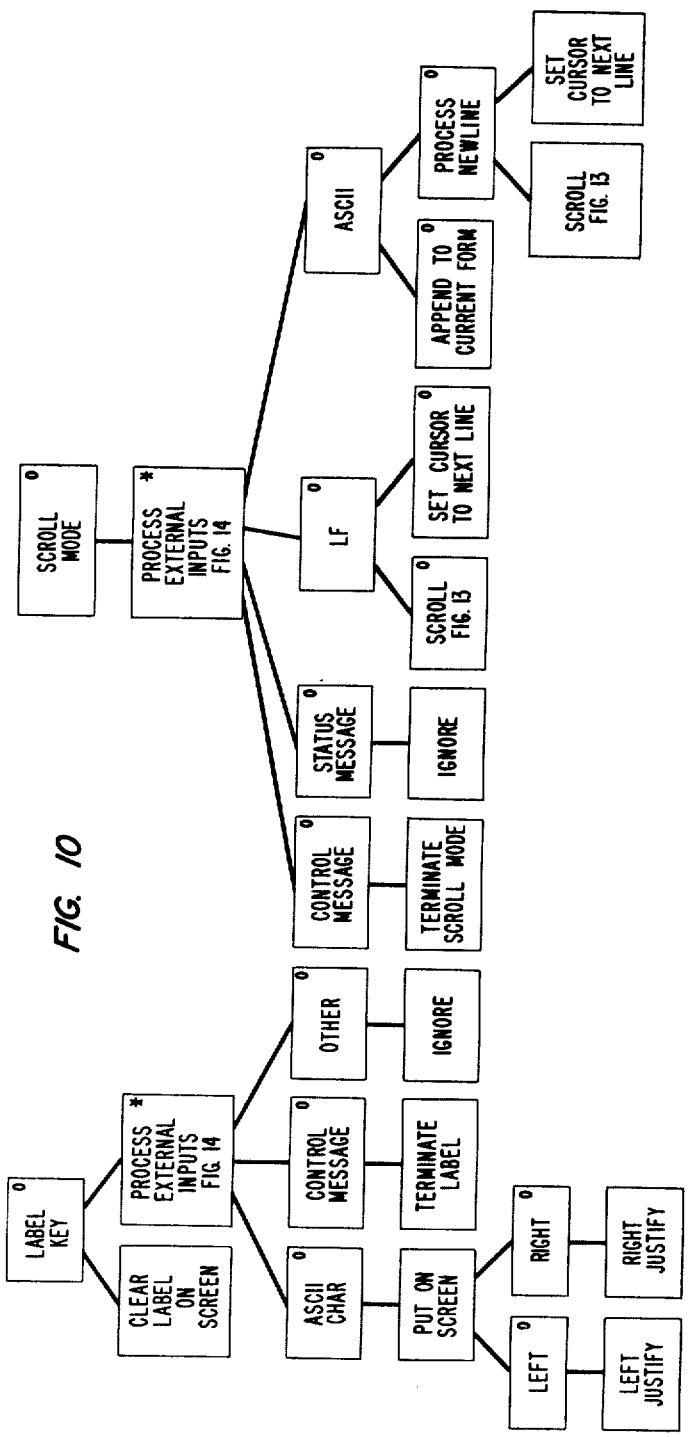
Figure 11:
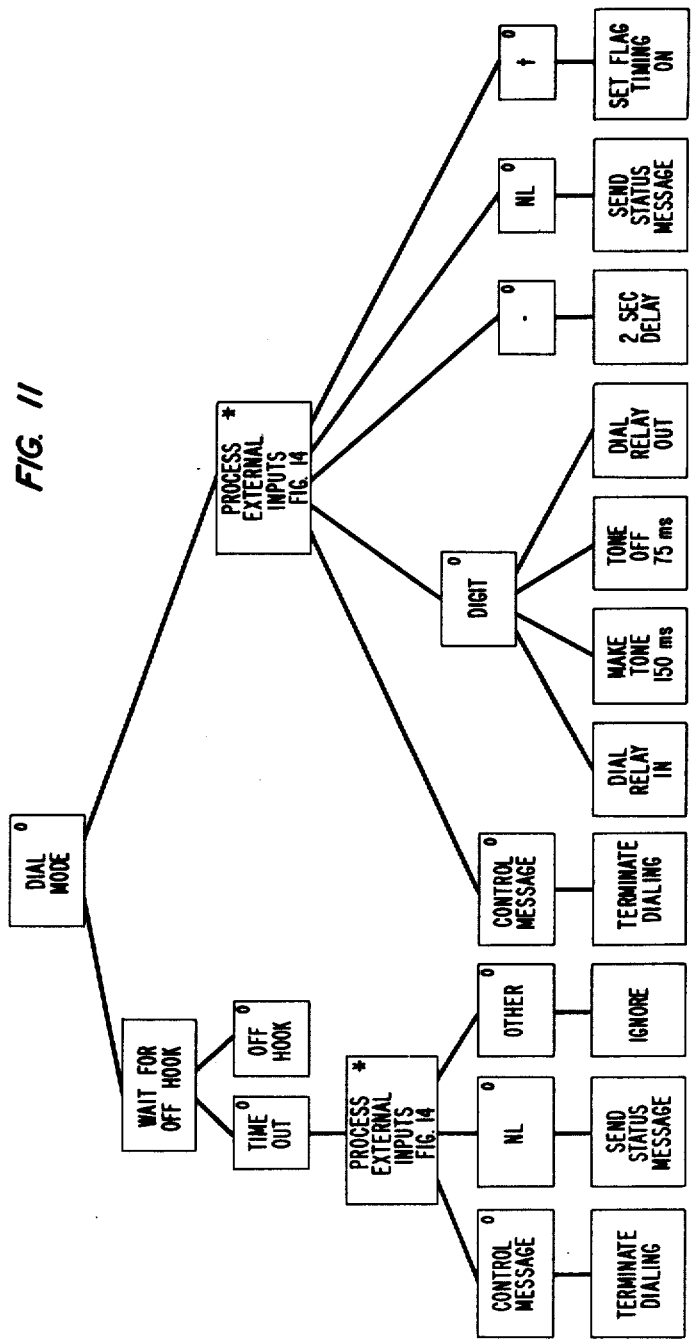
Figure 12:
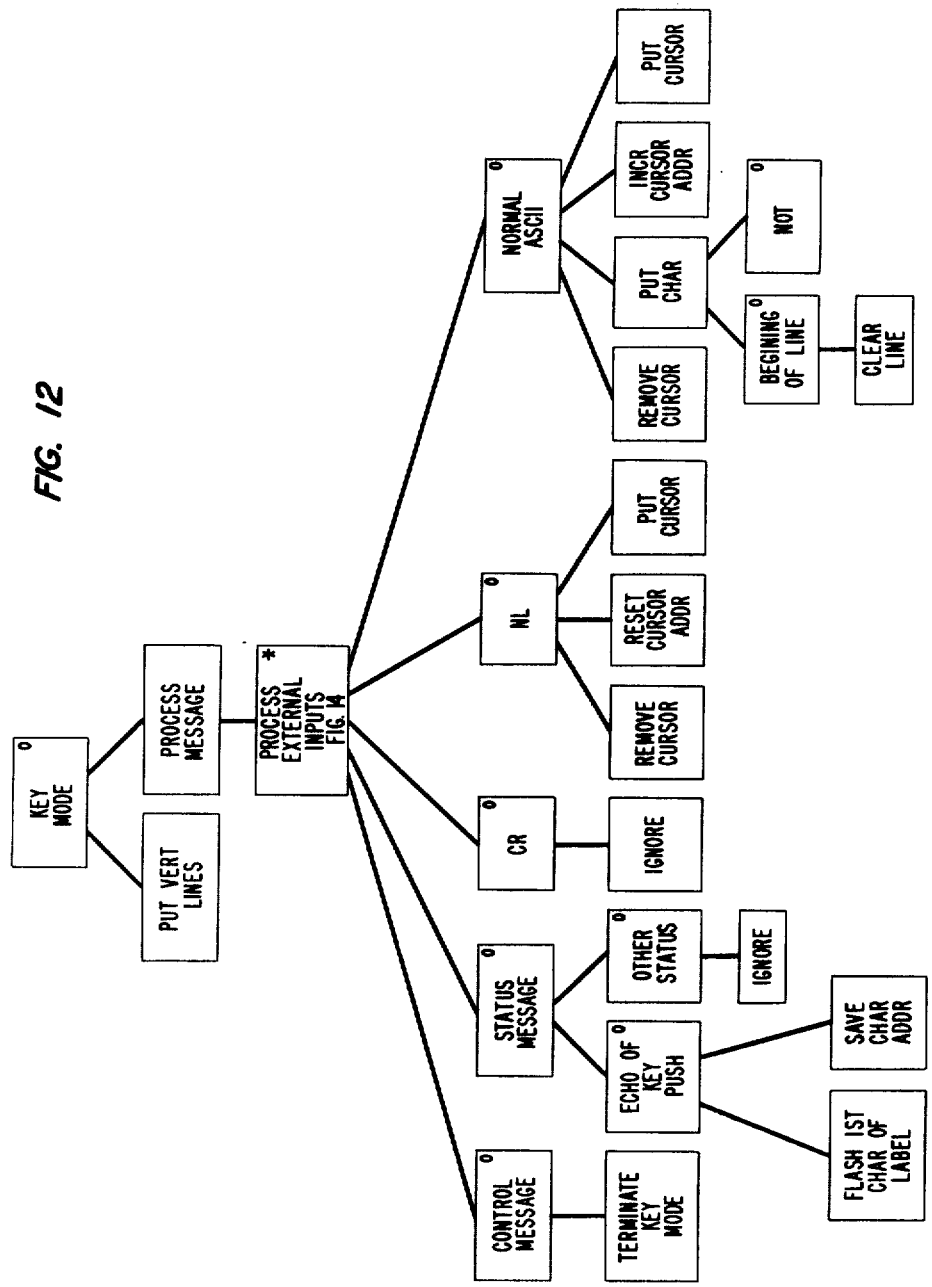
Figure 14:
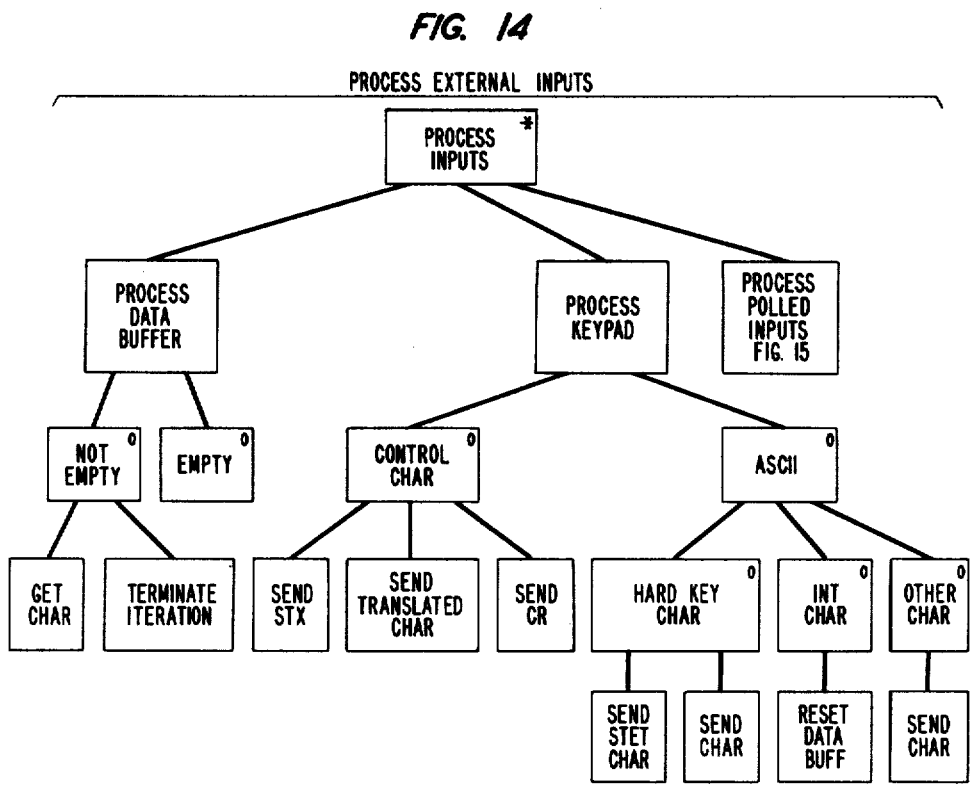
Figure 15:
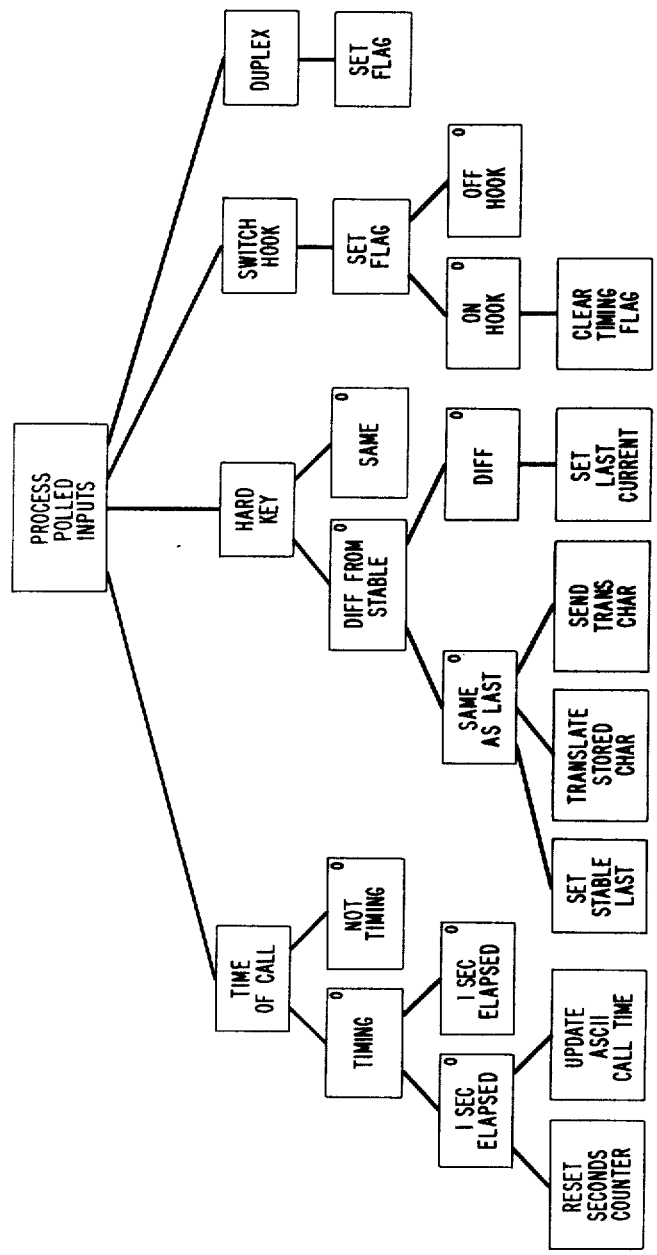

FIG. 9 and each of the charts in the FIGS. 10 through 12 include an iteration block PROCESS EXTERNAL INPUTS (PEI) which is depicted in greater detail in FIG. 14 and in still further detail in FIG. 15. These latter two figures will be discussed before proceeding further with FIGS. 10 through 12. The PEI process includes within itself a further iterative process designated PROCESS INPUTS (PI) as shown in FIG. 14. The latter process services external inputs by the station set user via the keypad or by the host via UART 89. The first function of the PI iteration processes the data buffer of processor 43 to look for inputs received by way of UART 89 from the host computer in accordance with an interrupt operation. Thus, any time that data from the host appears in the UART, processor 43 interrupts its other operations to load the data into its data buffer. If the buffer is empty when checked per FIG. 14, the process returns to PI to pick up the next step of the iteration. If the buffer is not empty, the data buffer character which is ready for processing is taken from the buffer; and the entire PI iteration is terminated by exiting to the calling function to perform the operation named by the exit character, i.e., the selection of one of the functions in the level below the PEI block of the chart from which the PI function was called.

The second step of the FIG. 14 PI iteration is a PROCESS KEYPAD operation in which processor 43 checks the keypad to determine whether a hard key or a soft key or an ASCII key had been actuated. If a soft key is involved, a control character operation is indicated, and the processor 43 translates the key output character into a corresponding three-character string and sends it to the host computer. The string includes the STX character followed by a character, such as a TABLE I label op-code, and further followed by the CR character. This identification of a soft key to the host effects host program mode selection as outlined in regard to FIG. 8. The process then returns to the PI level in FIG. 14 and commences execution of the PROCESS POLLED INPUTS (PPI) step of the iteration. On the other hand, if the keypad output were an ASCII character that is also used for a hard key function used as described in Table II, such a character is handled as earlier described before returning to the PI level. That is, the ASCII key actuation is recognized and causes the process to send to the host computer the escape character (illustratively backslash " ") followed by the particular ASCII character (Table II, line B=3); and the process returns to the PI level. If the ASCII interrupt character is recognized, the process resets the data buffer to the all-zero condition and returns to the PI level. If any other ASCII character is recognized, it is transmitted to the host computer via UART 89; and the process traverses to the PI level to execute the PPI step.

FIG. 15 illustrates the details of the PPI step of the PI iteration of FIG. 14. The PPI process also services station set user inputs and comprises a sequence of operations wherein various user related functions are polled. In a first of these functions, the process determines whether or not an operation-timing capacity has been called, generally by the host, by inserting a "t" in the string of Table I command "u". If operation timing is in effect, the process displays on screen 13 the elapsed time of a user operation, e.g., a user originated telephone call; and in so doing it repeatedly checks to determine whether or not one second has elapsed since a prior check on the timing operation. If it has, a seconds counter in the processor 43 is reset and appropriate ASCII code is generated to update the elapsed time display on the bottom line of screen 13. After doing that, or if less than one second had elapsed, or if the timing function was not in effect, the process traverses back to the PPI level to take the next step of the sequence.

The second step of the PPI sequence is the HARD KEY process in which the actuation of a hard key on the keyboard is debounced prior to utilization (soft key and ASCII key actuations in the illustrative embodiment are advantageously debounced by a separate hardware chip not shown rather than by using the software operation here illustrated in FIG. 15). In performing the debounce operation, the "current" key contact state, the "last" state prior to the present hard key check, and a "stable" state immediately prior to the aforementioned last state are checked. If the current state is different from the stable state but the same as the last state, the process recognizes that a new stabilized character value is present, sets the aforementioned stabilized value to be equal to the last value, and sends the same character value (after any translation according to Table II) to the host computer. Upon completion of that function, or if the initially received hard key character had been the same as the stable value, the process returns to the PPI level. However, if the initially receive key character were different from both the stable value and the last value, the process recognizes that the key state is unstable, sets the last value equal to the current value, and returns to the PPI level.

The next step in the PPI sequence is to examine the state of the handset, i.e. the switch hook, to see whether or not to change the set of a timing flag which indicates whether or not the timing operation is running. If the handset is on-hook, the process presumes that it had been off-hook earlier and clears the timing flag. After this or if the process had found the handset off-hook earlier, the process assumes that any timing in effect should remain so and returns to the PPI level to consider the next step in the sequence.

At the duplex step, the last step in the PPI sequence, the FD/HD option switch is compared with its previous state. If it has changed, the set is put in the mode given by the current switch state. From that point, the process returns to the PI level of the chart of FIG. 14. Here a new PI iteration is begun. The previously described succession of events for the charts of FIGS. 14 and 15 repeats over and over again until the processing of the data buffer produces a usable exit character that allows the PI iteration to be terminated and allows the process to read out a corresponding exit character to the PEI point in one of the charts from which the PI function had been called. That exit character is used to determine the next selection to be executed in the PEI iteration. That selection execution is followed by either another repetition of the PEI iteration or traversal to a higher level as may be appropriate for that selection.

In FIG. 9, the SET PARAMETERS selection is called by the Table I op-code "s" and is used to make up the Table II for further operation of the station set in conjunction with a host computer. This operation includes a two-component sequence, the first component is the PEI iteration and the output of that iteration identifies one of two possible selections. If the PEI exit character is a control message directing termination of the SET PARAMETERS operation, it indicates that the changes in entries in Table II have been completed; and the process traverses to the PCM level of FIG. 9. On the other hand, if the PEI output character indicates some other message, a two element sequence is initiated to determine which line of Table II is involved and enter the received character. A subroutine is also included for spelling (encoding) certain control characters so their function is not actually executed during writing of the Table.

Further, in FIG. 9, the POSITION CURSOR operation is also illustrated and represents a sequence called by the Table I op-code "x". This operation is required during writing of text on the screen 13 and is used to develop signals to prepare processor 43 to put a character in a desired screen location. The first step in the sequence is to remove the cursor from the screen, and the second is to register in processor memory a two-character message (line number and character position number) from the host defining the new cursor location. Thereafter VRAM 59 is directed to place the cursor on screen 13 in its new location, and the next step of the sequence involves traversing to the SCROLL mode wherein a character will be written at the new cursor location.

FIG. 10 illustrates the LABEL KEY sequence in the FIG. 9 selection. This sequence, called by one of Table I op-codes a-1, is used to write labels on the screen 13 adjacent to the respective keys 16. The sequence is repeatedly employed by the host when directing displays such as in FIG. 8. The particular key involved is identified by the format of the command as indicated in Table I. The first step is to clear the screen at the indicated key label position. Then the PEI iteration is performed to obtain a character naming one of three selections. One selection recognizes an ASCII character to be written and places the character on the screen 13 on either the left hand or the right hand side and correspondingly justified with respect to the screen margin. After that placement the process returns to PEI. Another possible selection is a control message indicating termination of the label operation and causing the process to traverse to the PCM level in FIG. 9. If any other message or character is recognized, it is ignored; and the process resumes the PEI iteration. Upon termination of the PEI iteration, the process returns to PCM level in FIG. 9; and in one embodiment the host follows the "terminate label", control message with a call for the KEY mode, to be described, to place the vertical dashed center line on the screen 13 display of labels.

Figure 13:
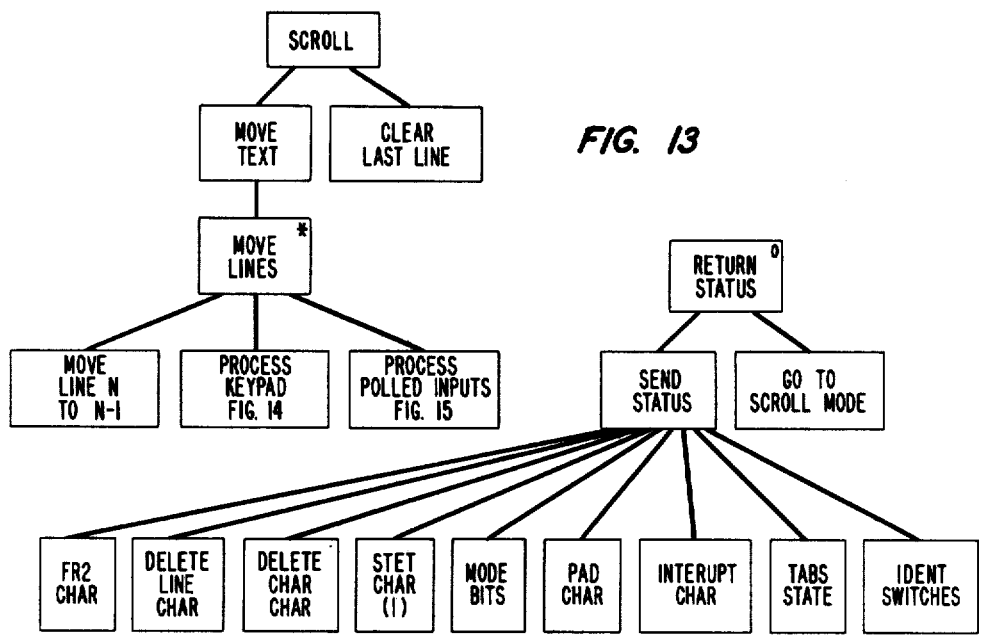

FIG. 10 also illustrates the chart for the SCROLL mode of FIG. 9. In this mode, called by the Table I ESC op-code, the processor 43 controls the writing of text on the screen 13 for purposes other than the writing of labels for the keys 16. The technique utilized is first to fill the screen with text starting at the upper left corner and extending, if necessary, through the bottom line. Text is taken from the processor 43 data buffer. At the end of the bottom line, step up all lines by one line position to leave the bottom line free for the entry of further new information. The latter operation, i.e., scrolling, is repeated for each new line of the same text and is illustrated in FIG. 13. As shown in FIG. 10, those text writing functions are carried out using the PEI iteration to determine one of four selections. A control message terminates the SCROLL mode, and a status message is ignored. A line feed indicates a short line of text and produces a SCROLL operation and a setting of the cursor to the next line. An ASCII character is added to the existing displayed text; and when the line is full, the process moves to a new line for further possible entries.

FIG. 11 depicts the process for the DIAL mode of operation. This mode, called by the Table I "u" op-code, is utilized to transmit to the switching office dialed information selected by the set user. The DIAL mode is initiated either by a set user or by a host. User initiation begins by user actuation of a soft key 16 informing processor 43 that the user will "call by number", i.e. type in the dialed digits. Thereafter the user must go off-hook before any station set output can be generated in the particular embodiment illustrated herein. Host initiation begins after a user has worked his way through display selections, as in FIG. 8, to a level at which the host has sufficient information to call up the dialing digits from memory. In either case the called party number information is collected in a data buffer of processor 43 prior to being applied to tone generator 47 for transmission.

Thus, in FIG. 11, the dialing process is a sequence in which the first step is to wait for the off-hook state. If off-hook has not yet occurred, a time-out interval of approximately 15 seconds is allowed in the illustrative embodiment for the subscriber to go off-hook. Thereafter, if the subscriber is still on-hook, a PEI iteration is initiated to select one of three alternatives. One is a control message terminating the dialing mode and causing the processor to return to the PCM level in FIG. 9. Another alternative is recognition of the NL character, i.e. a new line signal, from the host computer after which a status message is sent to advise the host that the subscriber did not yet lift the handset. The host then calls the KEY mode and displays an instruction for the user and sends another NL to the processor 43. A third alternative is any other character, and these are ignored. Following either of the latter two alternatives, the process returns to the "wait for off-hook" iteration until such time as the user goes off-hook. If that never happens, the process is locked in this subroutine until the user or the host takes some new action that can break the cycle.

The second step in the DIAL mode sequence is started with a new PEI iteration to select one of five illustrated alternatives. A first alternative is a control message terminating the dialed mode. A second is recognition of a dialed digit and initiation of a sequence wherein the dial relay 81 is actuated, the corresponding multifrequency tone is generated by tone generator 47 for approximately 150 milliseconds followed by a tone-off interval of 75 milliseconds, and then the dialing relay is dropped out. A third alternative is transmission of a hyphen character, e.g., between groups of dialed digits, to force a two-second delay between output tone sequences. A fourth alternative is the new line operation NL as already described. A fifth alternative is the command which indicates that the subscriber requires the calling operation to be timed, sets a timing flag in processor 43 to the on-state, and starts a timing counter in processor 43. This PEI iteration is recurrently executed until the stream of digits for dialing is exhausted and a termination control message ends the iteration and returns the process to the PCM level of FIG. 9.

FIG. 12 is a so-called KEY mode, Table I op-code "w", which is used after keys have been labelled by the host, to cause the set to wait for one of a number of alternative actions to take place. In the KEY mode sequence the first step is to put the dashed vertical line between right and left parts of screen 13 to facilitate reader discrimination between the two text parts. The next step starts with a PEI iteration for selecting one of five processes. A first is a control message to terminate the mode. A second is one in which the process recognizes the echo of a soft key actuation status message as returned by the host computer. Instead of providing corresponding display to the VRAM 59, processor 43 initiates the recurrent flashing of the first character of the label associated with that key and saves the identification of the key character address on screen 13 in order to terminate the flashing upon receiving an appropriate host computer response with respect to the function corresponding to the key. Another alternative is a carriage return which is ignored. A fourth alternative is a new line character NL; and in this environment, such a character initiates a sequence of three operations. The first removes the cursor from the screen 13; then the cursor address is reset to an address indicating a new position on screen 13; and finally the cursor is rewritten on the screen at the new line location. The fifth alternative in the PEI iteration is recognition of a normal ASCII character. In this event, a sequence is initiated to remove the character cursor, place the character at an appropriate position on the line, i.e., clearing the line if that position is at the beginning of the line, increment the cursor address, and replace the cursor on the screen at the new address.

The RETURN STATUS mode, Table I op-code "y," is shown in FIG. 13 and includes a two-step sequence. The status of various station set functions is transmitted to the host computer in the left-to-right order illustrated, and then the process traverses to the SCROLL mode. As shown in FIG. 13, the status message illustratively includes the characters used by the three hard keys, the characters used as the STET character, the states of mode bits from Table II at B=4 indicating whether or not the Table II translation is to be in effect, the characters used as the pad character and the interrupt character, op-code "t" tab interval data, and the states of the station set identification number switches.

Also shown in FIG. 13 is the SCROLL operation included in the FIG. 10 SCROLL mode. This includes an iteration wherein the first step includes shifting existing lines of text on the screen 13 upward by one line position, processing the keypad using a routine as shown in FIG. 14 (but not returning to PI) and processing polled inputs as shown in FIG. 15 (but not returning to PI). That iteration repeats until such time as the value of N goes to 32, when the process terminates "move lines". Then the last line of the display is cleared.

Although the present invention has been described in connection with a particular embodiment thereof, it is to be understood that additional embodiments, modifications and applications which will be obvious to those skilled in the art are included within the spirit and scope of the invention.

We claim:

1. A general-purpose electronic telephone station set for use in conjunction with a host computer (40) and having plural user-controllable operations, said set including transducers (17) for audio input/output of received or transmitted signal information, a display screen (13) for video output of information, a keyboard (20) including a plurality of keys for manual input of signal information, and data processing means (43) for electrically intercoupling the keyboard, the screen, and the transducers for programmable interaction, the improvement comprising plural function keys (16) arrayed along at least one side of the screen in positions corresponding to different line positions on the screen, said function keys being coupled to said data processing means for inclusion in said programmable interaction, and said data processing means including means, responsive to signals from said host computer, for displaying in text on said screen an initial set (140) of user-selectable choices of station set operations, such choices including at least one called station calling mode (CALL BY TYPING), means, responsive to actuation of at least one of said function keys, for sending to said host computer signals identifying such one key, and means, responsive to signals from said host computer directing the one of said calling modes corresponding to the identified function key, to produce signals identifying said called station.

2. The station set in accordance with claim 1 in which said processing means comprises means (FIG. 10 LABEL KEY) for generating a text label on said screen adjacent to at least one of said plural function keys, and means (FIG. 12), responsive to set user actuation of the last-mentioned one plural function key, for recurrently flashing a predetermined character of a label adjacent thereto prior to generation of a new label in response to the key actuation for informing the user that the key actuation has been recognized.

3. The station set in accordance with claim 1 in which a voice signal circuit port (21) and a data signal circuit port (22) are provided, means (HS1, HS2) are provided for user-controllably connecting said transducers to said voice signal port, means (HS5) are provided for coupling to said processing means signals indicating the state of said connecting means, means (89, 90) are provided for continuously coupling said processing means to send and receive signals through said data port with respect to said host computer, and said processing means includes means (FIG. 10 LABEL KEY), responsive to signals received via said data port, for actuating said screen to display information corresponding to such data port signals.

4. The station set in accordance with claim 1 in which means (90) are provided for coupling data signals into and out of said station said with respect to said processing means, said coupling means comprising means (118) for coupling keyboard output signals from said processing means directly back to said processing means for controlling said display screen, means (110) for coupling signals received from external to said station set for controlling said display screen, and means (RM/LOC and 116) for selectively actuating only one of said direct signal coupling means or said external signal coupling means.

5. The station set in accordance with claim 1 in which said plurality of keys in said keyboard includes an ASCII key set (20) for outputting a predetermined set of selectable characters representing respective, different ones of a predetermined set of letters, numbers, and functions, and additional keys (30–32) for outputting from each such additional key a signal corresponding to a respective predetermined information processing function of said host computer, and said data processing means includes means (FIG. 15 translation) for translating each of said additional key output signals to a predetermined respective character recognized by said host computer for said corresponding function.

6. The station set in accordance with claim 1 in which a common housing (11,12), is provided for holding the aforesaid elements of such set.

7. The station set in accordance with claim 6 in which said housing includes a hood portion (12) framing said display screen and said display screen is recessed into said hood portion for limiting the viewing field therefor.

8. The station set in accordance with claim 7 in which said housing further includes a base portion (11), said display screen is included in a cathode ray tube mounted in a semirigid frame (119) secured in said housing base portion, said keyboard rests on a shoulder portion (120) in walls of said housing base portion adjacent to said cathode ray tube with an edge of said keyboard engaging said display screen along a lower portion thereof, said keyboard being of sufficient size to cause a deflection of said frame upon insertion of the keyboard into a rest position on said shoulders thereby causing said keyboard to engage the wall of said housing at a keyboard edge opposite to the edge engaging the display screen, said hood portion substantially entirely encloses said cathode ray tube except for the display screen portion thereof and is secured to said base portion of said housing, and a flexible bezel (115) is provided for masking upper and side edges of said display screen portion and engaging adjacent edges on said hood portion, said display screen portion of said cathode ray tube, and opposite end portions of said tube-engaging edge of said keyboard for interlocking all of such hood, screen, and keyboard in stable positions in said housing.

9. The station set in accordance with claim 6 in which
said audio transducers are included in a telephone handset (17),
said housing has a depth and width which are each less than one and one-half times the length of said handset, and
said housing has a height which is less than the length of said handset.

10. The station set in accordance with claim 1 in which
means (56) are provided for electrically representing an identification number for said set, and
said processing means includes means (FIG. 13 RETURN STATUS) for transmitting to said host computer a data message including signals representing the status of predetermined set operational features including said identification number.

11. The set in accordance with claim 1 in which there are provided
a voice signal input-output port (21) and a data signal input-output port (22),
means for coupling said transducers to said voice signal port for sending and receiving voice signals,
means (47,80), controlled by said processing means, for coupling signal information from said keyboard to said voice signal port for sending dialing signals, and
means (89), responsive to said processing means, for coupling said keyboard and screen to said data signal port to send and receive data signals.

12. The station set in accordance with claim 1 in which
said screen is of sufficient line and character size to display a page-type array of text, and
said keyboard is a typewriting type keyboard in which any given actuation of a key corresponds to a discrete information character or function.

13. The station set in accordance with claim 1 in which
said one calling mode is a dial-by-menu mode,
a voice signal port (21) is provided for coupling said signal information into and out of said set with respect to said transducers, and
said processing means includes means, responsive to signals from said host computer, for outputting by way of said voice signal port signals representing numerical characters identifying said called station as identified by a particular combination of a display of user choices and actuation of one of said function keys.

14. The station set in accordance with claim 1 in which
at least one fixed function, display action key (23) is provided to produce, on actuation of each such key, a different predetermined display effect which is independent of the information content of the display.

15. The station set in accordance with claim 14 in which
signals from said host represent predetermined parts of hierarchically organized information wherein each hierarchical level, except the highest level, includes at least one block of detailed information associated with a single predetermined information element of the next higher hierarchical level, and
said processing means includes means, responsive to actuation of both a predetermined one of said fixed function display action keys and one of said plural function keys, for causing said host computer to traverse the displayed information to a different hierarchical level of stored information associated with displayed information in a screen line position corresponding to the one actuated function key.

16. The station set in accordance with claim 14 in which said processing means includes
means responsive to actuation of a predetermined fixed function display action key for cooperating with said host computer to display on said screen a text explanation of the user choices available with information displayed at the time when such predetermined display action key was actuated.

17. The station set in accordance with claim 1 in which said processing means includes
means, responsive to signals from said host computer, displaying on at least one additional text display of set-user-selectable choice of set operations or data.

18. A general-purpose electronic telephone station set for use in conjunction with a host computer (40), said set including transducers (17) for audio input/output of received or transmitted signal information, a display screen (13) for video output of information, a keyboard (20) including a plurality of keys for manual input of signal information, and data processing means (43) for electrically intercoupling the keyboard, the screen, and the transducers for programmable interaction, the improvement comprising
plural function keys (16) arrayed along at least one side of the screen in positions corresponding to different line positions on the screen, said function keys being coupled to said data processing means for inclusion in said interaction,
said plurality of keys in said keyboard includes
a key set (20) for outputting a predetermined set of selectable characters representing, respectively, different ones of a predetermined set of letters, numbers, and functions, and
additional keys (30–32) for outputting from each such key a signal corresponding to a respective predetermined information processing function available in said host computer, and
said data processing means includes means (FIG. 15 translation) for determining from said host characters said host recognizes as requests for said processing functions and translating each said additional key output signal to a corresponding one of said host characters.

19. The station set in accordance with claim 18 in which
said keyset selectable characters include at least one character which is also one of said additional key characters corresponding to a processing function, and
said data processing means includes means (FIG. 14 HARD KEY CHAR.) for recognizing actuation of a key set key corresponding to said one character and prepending to such character a predetermined control character (Table II, line B=3) to indicate actuation of the last-mentioned key rather than one of said additional keys.

20. The station set in accordance with claim 18 in which said processing means includes means (54) for coupling said plural function keys to said data processing means to provide signals uniquely designating user selection of a corresponding discrete line portion of text on said screen.

21. The station set in accordance with claim 18 in which said keyboard further includes further plurality of function keys (23) coupled to said data processing means for indicating, when actuated, user selection of a predetermined type of display action.

22. A general-purpose electronic telephone station set for use in conjunction with a host computer (40), said set including transducers (17) for audio input/output of received or transmitted signal information, a display screen (13) for video output of information, a keyboard (20) including a plurality of keys for manual input of textual information, and data processing means (43) for electrically intercoupling the keyboard, the screen, and the transducers for programmable interaction, the improvement comprising plural function keys (16) arrayed along at least one side of the screen in positions corresponding to different line positions on the screen, said function keys being coupled to said data processing means for inclusion in said interaction, and said data processing means includes means (FIG. 14 CONTROL CHARACTER) for translating an output of any of said plural function keys to any selectable one of plural textual characters and assembling such one character into a data message, for said host computer, along with a predetermined operational prefixal character (STX) and a predetermined operational suffixal end-of-message character (CR).

23. The station set in accordance with claim 22 in which means (90), coupled to said processing means, are provided for communicating with a host computer at least to receive signals representing for display information corresponding to actuation of one of said function keys, the reception thereof possibly being delayed for a substantial time after actuation of such one key, and said processing means comprises means (FIG. 10 LABEL KEY), responsive to said display information signals, for generating a text label on said screen adjacent to at least one of said plural function keys, and means (FIG. 12), responsive to set user actuation of said one plural function key, for recurrently flashing, during said time, a predetermined character of a label adjacent to such key at the time of actuation for informing the user that the key actuation has been recognized.

24. A general-purpose electronic telephone station set including transducers (17) for audio input/output of received or transmitted signal information, and a display screen (13) for video output of information, the improvement comprising a keyboard (20) including a plurality of keys for manual input of signal information, plural function keys (16) arrayed along at least one side of the screen in positions corresponding to different line positions on the screen, data processing means (43) in the set for electrically intercoupling the keyboard, the function keys, the screen, and the transducers for programmable interaction, said display screen being a part of a cathode ray tube display means including beam deflection controlling coils (118) coupled to said tube, one set of such coils being operable in the audible frequency range, and hybrid coupling transformer coils (76) for coupling output and input portions of said transducers to an analog signal input/output port (21) of said station set, said transformer coils being oriented with respect to said controlling coils to produce minimum deflection signal noise in said transducers.

25. A general-purpose electronic telephone station set including transducers (17) for audio input/output of received or transmitted signal information, and a display screen (13) for video output of information, the improvement comprising a keyboard (20) including a plurality of keys for manual input of signal information, plural function keys (16) arrayed along at least one side of the screen in positions corresponding to different line positions on the screen, data processing means (43) in the set for electrically intercoupling the keyboard, the function keys, the screen, and the transducers for programmable interaction, said display screen being a part of a cathode ray tube display means including inductive ray deflection controlling means (118) coupled to said tube, and operable in the audible frequency range, and hybrid coupling transformer coils (76) for coupling output and input portions of said transducers to an analog signal input/output port (21) of said station set, said transformer coils being oriented so that the mutual inductance with said inductive ray deflection controlling means is at a minimum level.

* * * * *

UNITED STATES PATENT AND TRADEMARK OFFICE
CERTIFICATE OF CORRECTION

PATENT NO. : 4,291,198

DATED : September 22, 1981

INVENTOR(S) : Robert V. Anderson, Douglas L. Bayer,
David W. Hagelbarger and Peter S. Kubik It is certified that error appears in the above—identified patent and that said Letters Patent is hereby corrected as shown below:

```
Column  2, line 62, "includes" should read --included--.
Column  3, line 51, "tough-typing" should read
--touch-typing--.
Column  6, line  5, "usuable" should read --usable--.
Column  6, line 23, "and" should read --an--.
Column  7, line 28, "but" should read --bit--.
Column  7, line 45, "hood" should read --hook--.
Column  7, line 47, "switchhood" should read
--switchhook--.
Column  8, line  5, "particulr" should read
--particular--.
Column 13, line 67, "Answer/Hand-up" should read
--Answer/Hang-up--.
Column 14, line  8, "offices" should read --office--.
Column 14, line 49, "acces" should read --access--.
Column 16, line  6, "thap" should read --that--.
Column 16, line  7, "mutiple" should read --multiple--.
Column 16, line 11, "opcode" should read --op-code--.
```

Signed and Sealed this

Nineteenth Day of January 1982

[SEAL]

Attest:

GERALD J. MOSSINGHOFF

*Attesting Officer*   Commissioner of Patents and Trademarks